United States Patent
Phelps et al.

(10) Patent No.: US 11,062,293 B2
(45) Date of Patent: Jul. 13, 2021

(54) METHOD AND SYSTEM FOR NEGOTIATING, GENERATING, DOCUMENTING, AND FULFILLING VENDOR FINANCING OPPORTUNITIES

(71) Applicant: De Lage Landen Financial Services, Wayne, PA (US)

(72) Inventors: Scott Phelps, Berwyn, PA (US); Elsie Libertini, West Chester, PA (US); Rafael Rosato, Berwyn, PA (US); Michael Napier, Collegeville, PA (US); Joshua Harrison, Alpharetta, GA (US); Heather Wilson, Suwanee, GA (US); Tim Gallagher, Lansdale, PA (US)

(73) Assignee: DE LAGE LANDEN FINANCIAL SERVICES, Wayne, PA (US)

( * ) Notice: Subject to any disclaimer, the term of this patent is extended or adjusted under 35 U.S.C. 154(b) by 1015 days.

(21) Appl. No.: 14/566,122

(22) Filed: Dec. 10, 2014

(65) Prior Publication Data
US 2015/0161583 A1 Jun. 11, 2015

Related U.S. Application Data

(60) Provisional application No. 61/914,146, filed on Dec. 10, 2013, provisional application No. 62/001,335, filed on May 21, 2014.

(51) Int. Cl.
*G06Q 20/22* (2012.01)
*G06Q 40/00* (2012.01)
(Continued)

(52) U.S. Cl.
CPC ......... *G06Q 20/227* (2013.01); *G06Q 10/107* (2013.01); *G06Q 20/102* (2013.01);
(Continued)

(58) Field of Classification Search
CPC ...... G06Q 40/02; G06Q 40/025; G06Q 40/00; G06Q 30/0601; G06Q 30/06;
(Continued)

(56) References Cited

U.S. PATENT DOCUMENTS 6,648,220 B1 * 11/2003 Junkins .................. G06Q 30/04
235/379
6,886,744 B2  5/2005 Ichihara et al.
(Continued)

OTHER PUBLICATIONS

Dai et al., Salesforce contract design and inventory planning with asymmetric risk-averse sales agents, Operations Research Letters 41, 2013, 6 pages.
(Continued)

*Primary Examiner* — Slade E Smith
(74) *Attorney, Agent, or Firm* — Buchanan Ingersoll & Rooney PC

(57) ABSTRACT

A method for managing a financing or lease of a product and/or service, the method executing on a computing device, the method including: receiving a price of the product to be financed or leased; receiving an amount of the price of the product to be financed; selecting a rate card; determining a current finance rate based upon the rate card that is selected; selecting a purchase option for the product and/or service; selecting a contract term of the financing or lease related to the purchase or lease the product and/or service; determining a payment amount for the product based on the inputted price of the product to be financed or leased, the amount of the price of the product to be financed, the current finance rate, the purchase option selected, and the term of the financing or lease selected; and displaying the payment amount that is determined.

21 Claims, 33 Drawing Sheets

(51) Int. Cl.
    *G06Q 10/10*         (2012.01)
    *G06Q 20/32*         (2012.01)
    *G06Q 20/14*         (2012.01)
    *G06Q 20/10*         (2012.01)
    *G06Q 30/06*         (2012.01)
    *G06Q 40/02*         (2012.01)

(52) U.S. Cl.
    CPC ....... *G06Q 20/145* (2013.01); *G06Q 20/3223* (2013.01); *G06Q 30/0645* (2013.01); *G06Q 40/00* (2013.01); *G06Q 40/02* (2013.01)

(58) Field of Classification Search
    CPC .. G06Q 30/0641; G06Q 20/10; G06Q 20/102; G06Q 20/227; G06Q 30/02; G06Q 30/0611; G06Q 30/0621; G06Q 30/0633; G06Q 30/0643; G06Q 30/0645; G06Q 40/04; G06Q 50/188; G06Q 10/107; G06Q 20/145; G06Q 20/18; G06Q 20/204; G06Q 20/3223; G06Q 30/0222; G06Q 30/0223; G06Q 30/04; G06Q 30/0603; G06Q 30/0609; G06Q 30/0625; G06Q 40/08; G06Q 99/00; G06F 3/04817; G06F 3/0482; G06F 3/04842
    USPC .......................................................... 705/35
    See application file for complete search history.

(56) References Cited

U.S. PATENT DOCUMENTS

| | | | | |
|---|---|---|---|---|
| 7,739,309 B2 * | 6/2010 | Singh | ..................... | G06F 40/186 707/802 |
| 7,904,326 B2 | 3/2011 | Gharavy | | |
| 7,958,024 B2 | 6/2011 | Chao et al. | | |
| 8,577,793 B1 * | 11/2013 | Hecht | .................. | G06Q 40/025 705/38 |
| 8,930,253 B1 * | 1/2015 | Ball | ....................... | G06Q 40/00 705/36 R |
| 9,659,293 B2 | 5/2017 | Dunwoody | ............. | G06Q 40/00 |
| 2001/0006383 A1 * | 7/2001 | Fleck | ..................... | G06F 3/03545 345/179 |
| 2001/0026609 A1 * | 10/2001 | Weinstein | ............. | H04M 15/06 379/93.01 |
| 2002/0082866 A1 * | 6/2002 | Ladouceur | ............. | G16H 40/67 705/2 |
| 2002/0082966 A1 * | 6/2002 | O'Brien | ................. | G06Q 10/10 705/36 R |
| 2002/0133374 A1 * | 9/2002 | Agoni | ..................... | G06Q 10/10 705/2 |
| 2002/0138419 A1 | 9/2002 | Melone et al. | | |
| 2003/0117380 A1 * | 6/2003 | Kanzaki | .............. | G06F 3/04847 345/173 |
| 2003/0216995 A1 * | 11/2003 | DePauw | ................. | G06Q 40/04 705/37 |
| 2004/0066404 A1 * | 4/2004 | Malik | .................. | G06Q 10/107 715/752 |
| 2004/0107164 A1 * | 6/2004 | Ghiloni | ................. | G06Q 30/04 705/40 |
| 2004/0122755 A1 * | 6/2004 | Bates | ..................... | G06Q 40/00 705/35 |
| 2004/0133479 A1 * | 7/2004 | Grove | ..................... | G06Q 40/00 705/26.3 |
| 2005/0149417 A1 * | 7/2005 | Crescenzo | ............. | G06Q 40/02 705/35 |
| 2005/0182643 A1 * | 8/2005 | Shirvanian | ....... | G06Q 10/06393 705/7.39 |
| 2005/0228745 A1 * | 10/2005 | McHale | ................. | G06Q 30/08 705/37 |
| 2005/0261029 A1 * | 11/2005 | Yang | ..................... | H04M 1/724 455/564 |
| 2007/0094417 A1 * | 4/2007 | Hur | ........................ | G06F 3/0362 710/1 |
| 2007/0152980 A1 * | 7/2007 | Kocienda | .............. | G06F 3/0236 345/173 |
| 2007/0155434 A1 * | 7/2007 | Jobs | ....................... | G06F 3/0236 455/565 |
| 2007/0203800 A1 * | 8/2007 | Opyd, III | ........... | G06Q 30/0601 705/26.1 |
| 2007/0226072 A1 * | 9/2007 | Gross | .................. | G06Q 30/0641 705/4 |
| 2008/0033866 A1 * | 2/2008 | Boswell | .............. | G06Q 40/04 705/37 |
| 2008/0120219 A1 * | 5/2008 | Chen | ..................... | G06Q 30/08 705/37 |
| 2008/0167083 A1 * | 7/2008 | Wyld | ................ | H04M 1/27485 455/566 |
| 2008/0201257 A1 | 8/2008 | Lewis et al. | | |
| 2008/0276168 A1 * | 11/2008 | Mansfield | ............. | H04M 1/233 715/702 |
| 2009/0119193 A1 | 5/2009 | Selleck | | |
| 2009/0216565 A1 * | 8/2009 | Opyd, III | ............... | G06Q 40/08 705/4 |
| 2009/0281878 A1 * | 11/2009 | Rane | ..................... | G06Q 40/04 705/37 |
| 2010/0262446 A1 * | 10/2010 | Sticker | .................. | H04L 45/124 709/227 |
| 2010/0299276 A1 * | 11/2010 | Shahine | .................. | G06Q 50/01 705/319 |
| 2011/0009991 A1 * | 1/2011 | Dinicola | .................. | G06Q 30/02 700/97 |
| 2011/0054987 A1 | 3/2011 | Nicolas et al. | | |
| 2011/0069012 A1 * | 3/2011 | Martensson | ........ | G06F 3/04886 345/173 |
| 2011/0131099 A1 * | 6/2011 | Shields | .............. | G06Q 30/0275 705/14.71 |
| 2011/0153450 A1 * | 6/2011 | McBride | ................ | G06Q 30/08 705/26.3 |
| 2012/0041816 A1 * | 2/2012 | Buchalter | .......... | G06Q 30/0242 705/14.41 |
| 2012/0127345 A1 | 5/2012 | Matsunaga | | |
| 2012/0158560 A1 | 6/2012 | Bowdler | | |
| 2012/0179536 A1 | 7/2012 | Kalb et al. | | |
| 2012/0221402 A1 | 8/2012 | Brown et al. | | |
| 2012/0226527 A1 * | 9/2012 | Carwile, Jr. | ......... | G06Q 10/107 705/7.38 |
| 2012/0254003 A1 * | 10/2012 | Krautter | ................ | G06Q 40/00 705/35 |
| 2012/0316942 A1 | 12/2012 | Sheperd | | |
| 2013/0030985 A1 * | 1/2013 | Shebesta | ................ | G06Q 40/02 705/38 |
| 2013/0173376 A1 | 7/2013 | Custer et al. | | |
| 2013/0212610 A1 * | 8/2013 | Hussain | .............. | H04N 21/2542 725/23 |
| 2013/0254103 A1 * | 9/2013 | Dunwoody | ............ | G06Q 40/00 705/39 |
| 2013/0304655 A1 | 11/2013 | Johnston et al. | | |
| 2013/0332313 A1 * | 12/2013 | Bermudez | ............. | G06Q 30/06 705/26.41 |
| 2014/0074689 A1 * | 3/2014 | Lund | .................... | G06Q 40/025 705/38 |
| 2014/0249991 A1 * | 9/2014 | MacInnis | ............. | G06Q 40/025 705/38 |
| 2015/0081803 A1 * | 3/2015 | Dick | ....................... | H04L 51/18 709/206 |
| 2015/0112756 A1 * | 4/2015 | Subramanian | ..... | G06Q 30/0201 705/7.29 |

OTHER PUBLICATIONS

Zimmerman, Mobile Computing: Characteristics, Business Benefits, and the Mobile Framework, Apr. 2, 1999, 27 pages.

Mar. 31, 2015 Notification of Transmittal of the International Search Report and Written Opinion issued in PCT/US2014/069481.

Extended European Search Report issued by European Patent Office in corresponding EP 14869935.8 dated Jun. 22, 2017.

* cited by examiner

METHOD AND SYSTEM FOR NEGOTIATING, GENERATING, DOCUMENTING, AND FULFILLING VENDOR FINANCING OPPORTUNITIES

CROSS-REFERENCE TO RELATED APPLICATIONS

This application is related to provisional application Ser. No. 61/914,146 filed on Dec. 10, 2013, and provisional application Ser. No. 62/001,335 filed on May 21, 2014, the entire contents of each of which are incorporated by reference herein.

BACKGROUND

The present system and method relate to a mobile application for negotiating, generating, documenting, and fulfilling vendor financing opportunities. The mobile application is executed on a computing device such as a laptop, tablet, smartphone, etc., and facilitates the financing or lease of a product and/or service.

SUMMARY

These and other exemplary features and advantages of particular embodiments of the method and system for negotiating, generating, documenting, and fulfilling vendor financing opportunities will now be described by way of exemplary embodiments to which they are not limited.

A method for managing a financing or lease of a product, the method executing on a computing device including a processor, a display unit, a transmitting unit, a user input device that is configured to accept inputs from a user, and a storage device storing executable instructions which when executed by the processor of the computing device perform the method, the method including: receiving, from an input by the user input device, a price of the product to be financed or leased; receiving, from an input by the user input device, an amount of the price of the product to be financed; selecting, by an input of the user input device, a rate card; determining, by the processor, a current finance rate based upon the rate card that is selected; selecting, by an input of the user input device, a purchase option for the product and/or service; selecting, by an input of the user input device, a total term of the financing or lease that will be made to purchase or lease the product and/or service; determining, by the processor, a payment amount for the product based on the inputted price of the product to be financed or leased, the amount of the price of the product to be financed, the current finance rate, the purchase option selected, and the total term of the financing or lease selected; and displaying the payment amount that is determined on the display unit.

A non-transitory computer readable storage medium storing computer program instructions which when executed cause a processor to implement a method for managing a financing or lease of a product, the method including: receiving, from an input by a user input device, a price of the product to be financed or leased; receiving, from an input by the user input device, an amount of the price of the product to be financed; selecting, by an input of the user input device, a rate card; determining a current finance rate based upon the rate card that is selected; selecting, by an input of the user input device, a purchase option for the product and/or service; selecting, by an input of the user input device, a total term of the financing or lease that will be made to purchase or lease the product and/or service; determining a payment amount for the product based on the inputted price of the product to be financed or leased, the amount of the price of the product to be financed, the current finance rate, the purchase option selected, and the total term of the financing or lease selected; and displaying the payment amount that is determined on a display unit.

A method for managing a financing or lease of a product, the method executed by a mobile application on a mobile computing device including a processor, a display unit, a transmitting unit, a user input device that is configured to accept inputs from a user, and a storage device storing the mobile application which contains executable instructions which when executed by the processor of the mobile computing device perform the method, the method including: receiving, from an input by the user input device, a price of the product to be financed or leased; receiving, from an input by the user input device, an amount of the price of the product to be financed; selecting, by an input of the user input device, a rate card; determining, by the processor, a current finance rate based upon the rate card that is selected; selecting, by an input of the user input device, a purchase option for the product and/or service; selecting, by an input of the user input device, a total term of the financing or lease that will be made to purchase or lease the product and/or service; determining, by the processor, a payment amount for the product based on the inputted price of the product to be financed or leased, the amount of the price of the product to be financed, the current finance rate, the purchase option selected, and the total term of the financing or lease selected; and displaying the payment amount that is determined on the display unit.

BRIEF DESCRIPTION OF THE DRAWINGS

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

This description provides exemplary embodiments only, and is not intended to limit the scope, applicability or configuration of the invention. Rather, the ensuing description of the embodiments will provide those skilled in the art with an enabling description for implementing embodiments of the disclosed methods and systems. Various changes may be made in the function and arrangement of elements without departing from the spirit and scope of the invention as set forth in the appended claims. Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

The method and system for negotiating, generating, documenting, and fulfilling vendor financing opportunities will now be described by reference to the accompanying drawings in which like elements are described with like figure numbers.

Figure 1:
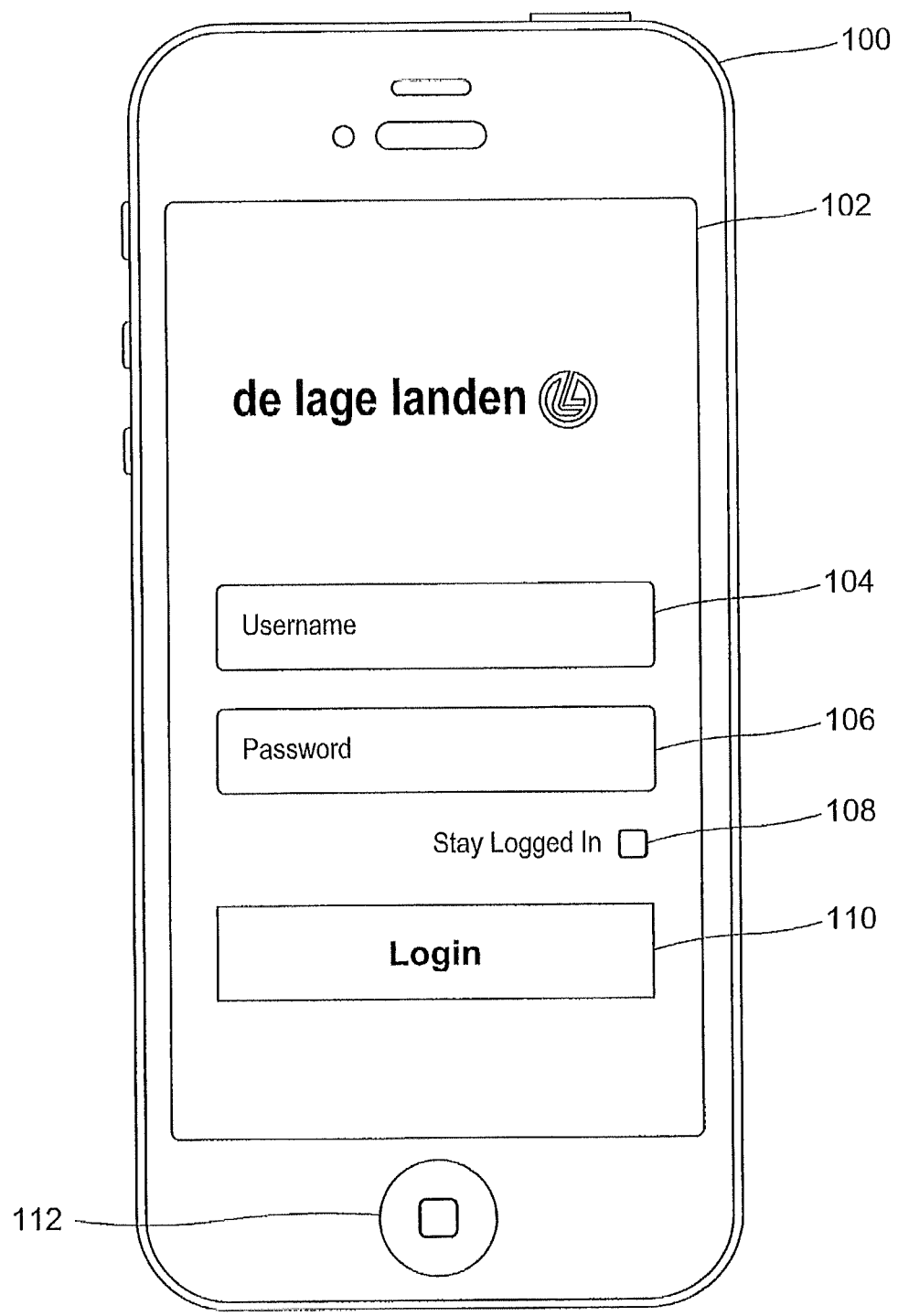
FIG. 1 illustrates an exemplary embodiment of a display page of the application for negotiating, generating, documenting, and fulfilling vendor financing opportunities.

FIG. 1 illustrates a login page for a mobile application that allows for coordination between internal and external resources, processes, tools and development infrastructure with a financings person in the field. The application allows a financing representative to tune and optimize deals instantaneously by providing current, real time information about pricing, incentives, bulk discounts, etc. regarding the product (e.g., office equipment, farming equipment, vehicle, etc.) or service the vendor's representative is selling. Here, real time means the information is effect at that instant that are posted on the appropriate servers or other accessible computer systems, allowing for inherent delays in electronic communications. The mobile application could also provide detailed information about the customer and perform credit check processing of the customer. In addition, the application has the ability to automatically create a purchase contract based on data inputted into the application and stored information the application can access. Once the contract is automatically generated, the customer has the ability to electronically sign a contract that is produced on the vendor's representative's computing device. Because the application has access to stored rate cards and/or rates, and the application can automatically create pricing quotes and contracts, there is no need for the user to carry printed rate cards, printed applications, or printed contracts with them when visiting a customer. The application also allows for modifications of contract terms on the screen, by allowing a user to select a specific contract term by highlighting or touching the contract term on the touchscreen of their smartphone, and replace the selected term with a different contract term, or add a new term. When the user selects a different contract term to replace an existing contract term, the application on the smartphone accesses a contract database 2910 that stores multiple template contract terms, the application requests the desired contract term that was selected by the user from among the multiple template contract terms, and the application running on the mobile phone receives the desired contract term from the contract database 2910. Then, the application updates the contract to include the received contract term. After the contract is updated, the modified contract terms will also be present in a final version of the contract (e.g. PDF version of the contract, etc.) when it is generated. Thus, a deal can be completed quickly only using the computing device storing the mobile application.

In an exemplary embodiment, the mobile application will be executed on a computing device 100, e.g. a smartphone, tablet, computer, etc., that includes a display screen 102. In an exemplary embodiment, the display screen 102 can function as a user input device such as a touchscreen, and receive commands via a user by the display screen sensing touch commands of a user. In an exemplary embodiment, the computing device 100 can receive commands from a user input device that is not a touchscreen, e.g., an external keyboard, touchpad, gesture sensor, mouse, trackball device, etc.

The exemplary display page of FIG. 1, which is a log in page, includes a username field 104 and a password field 106 in which a user can enter their username and password in order to access the features of the application. Once the user has entered in their username and password, they can click on log in box 108 to remain logged in without having to re-enter their username and login information. In an exemplary embodiment, the user will be authenticated after the user selects the login button 110 with the user input device 102. Also shown in FIG. 1 is a home button 112 of the computing device 100 (e.g., smartphone, tablet computer or other mobile computing device), which when pressed will cause the application to no longer be displayed on the display screen 102. In an exemplary embodiment, the mobile application can display the branding information (logo, name, etc.) of a vendor/dealer on one or more screens of the application. For example, a logo of a dealer can be shown in a screen where a customer previews the terms or details of the transaction (e.g. the screens shown in FIGS. 13-17).

Figure 2:
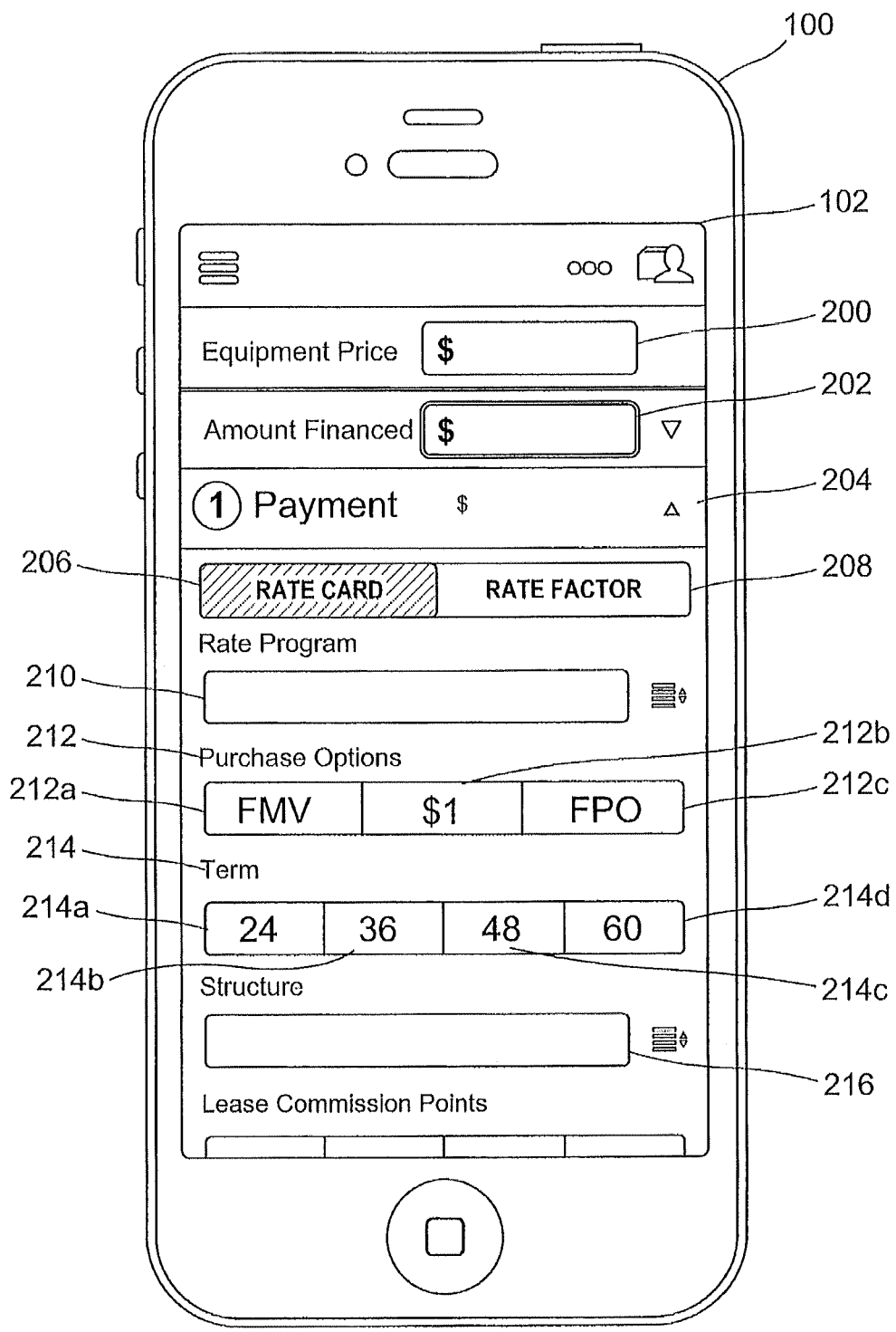
FIG. 2 illustrates an exemplary embodiment of a display page of the application for negotiating, generating, documenting, and fulfilling vendor financing opportunities.
Figure 5:
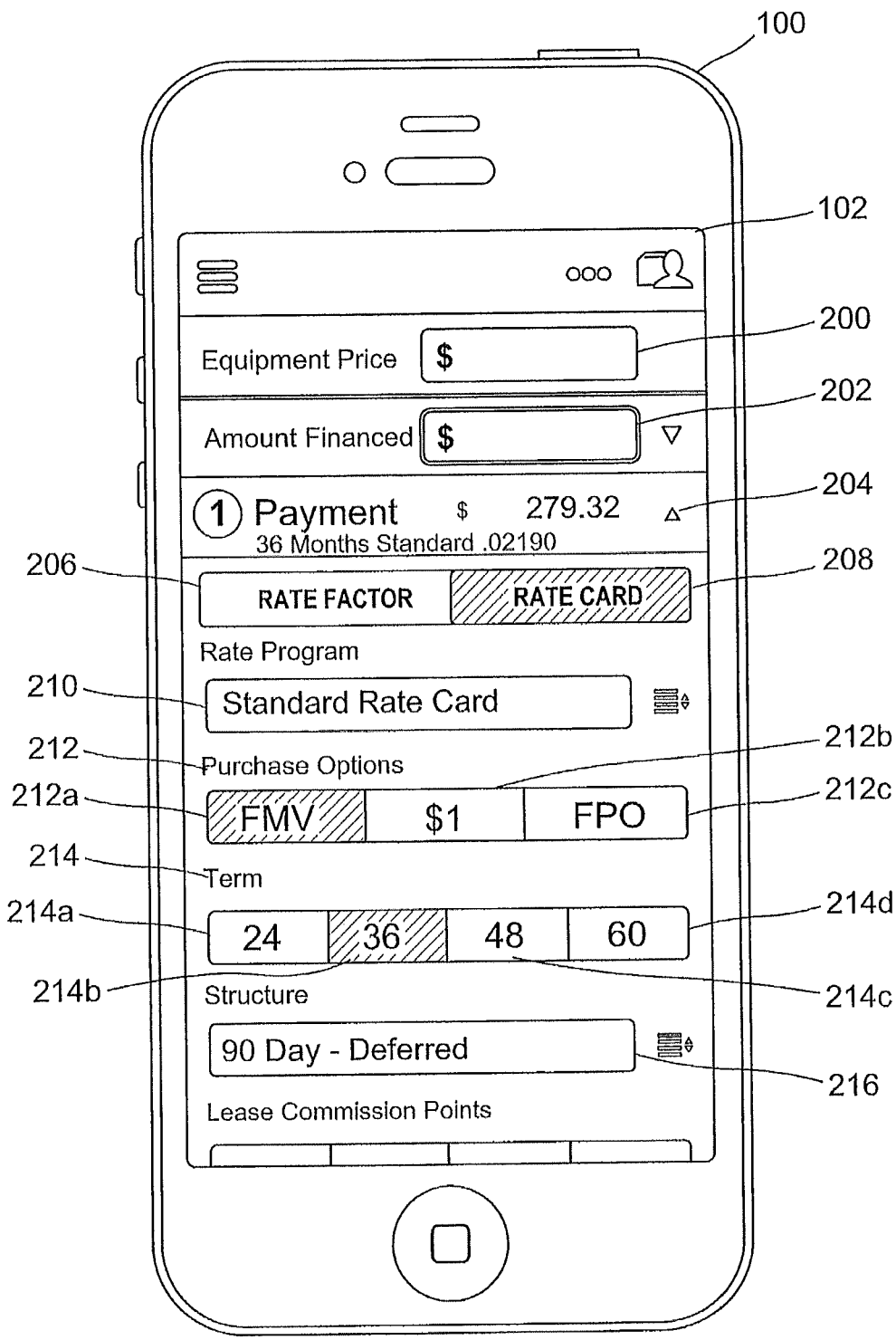
FIG. 5 illustrates an exemplary embodiment of a display page of the application for negotiating, generating, documenting, and fulfilling vendor financing opportunities.

FIG. 2 illustrates an exemplary display page of the application that includes a plurality of input fields. In an exemplary embodiment, the mobile application includes an equipment price input field 200 into which the price of a piece of equipment can be inputted. For example, if a copier is to be leased or sold, the price of the copier would be inputted into the equipment price input field 200. The price can be input by way of drop down menu that lists the copier model or other identifying information and a current price as provided by a server, associated with an office 2900 (FIG. 29), and particularly a pricing database 2912, perhaps filtered to include only those models currently in inventory via a check of the inventory database 2908. FIG. 2 also includes an amount financed field 202 in which the user can input the amount of money that will be financed of the total equipment price of the product that will be leased or sold. For example, if a copier is being leased or sold that costs $27,000, the amount financed could be any amount lower than the equipment price, e.g., $20,000, when a customer indicates a willingness to pay $7,000 up front or other accommodation is made. In an exemplary embodiment, FIG. 2 includes a payment field 204. The payment field 204 will show the dollar amount of the payments for the amount financed that is calculated by the computing device 100 or calculated by a processor associated with the office 2900 and transmitted to the computing device 100, to be specified in the amount financed input field 202. For instance, the payment amount shown in the payment field 204 is determined by a processor 2504 (FIG. 25) based upon the interest rate, term of the lease or financing, etc. For example, payment field 204 shown in FIG. 5 shows a calculated payment amount of $279.32. FIG. 2 also includes a rate card selection button 208 and a rate factor selection button 206. The functions associated with the rate card selection button 208 and the rate factor selection button 206 will be discussed in detail later. When the rate card selection button 208 is selected, a specific rate program can be selected by a rate program selection drop-down menu 210, for example.

In an exemplary embodiment, FIG. 2 shows a display page of the application that includes a purchase options area 212, which includes several purchase options that can be selected. For example, the purchase option area 212 includes a fair market value purchase option 212a, a $1 purchase option 212b, and a fixed payment option 212c. In an exemplary embodiment, FIG. 2 also displays a payment term area 214, in which the term of the financing or lease can be selected. For example, FIG. 2 shows a 24 month term option 214a, a 36 month term option 214b, a 48 month term option 214c, and a 60 month term option 214d. The term of the financing or lease is not limited to 24, 36, 48, or 60 months, but rather can be any term of the financing or lease, which can be optionally customized by the user. In an exemplary embodiment, FIG. 2 may also include a payment structure area 216, which will be discussed in greater detail later.

Figure 3:
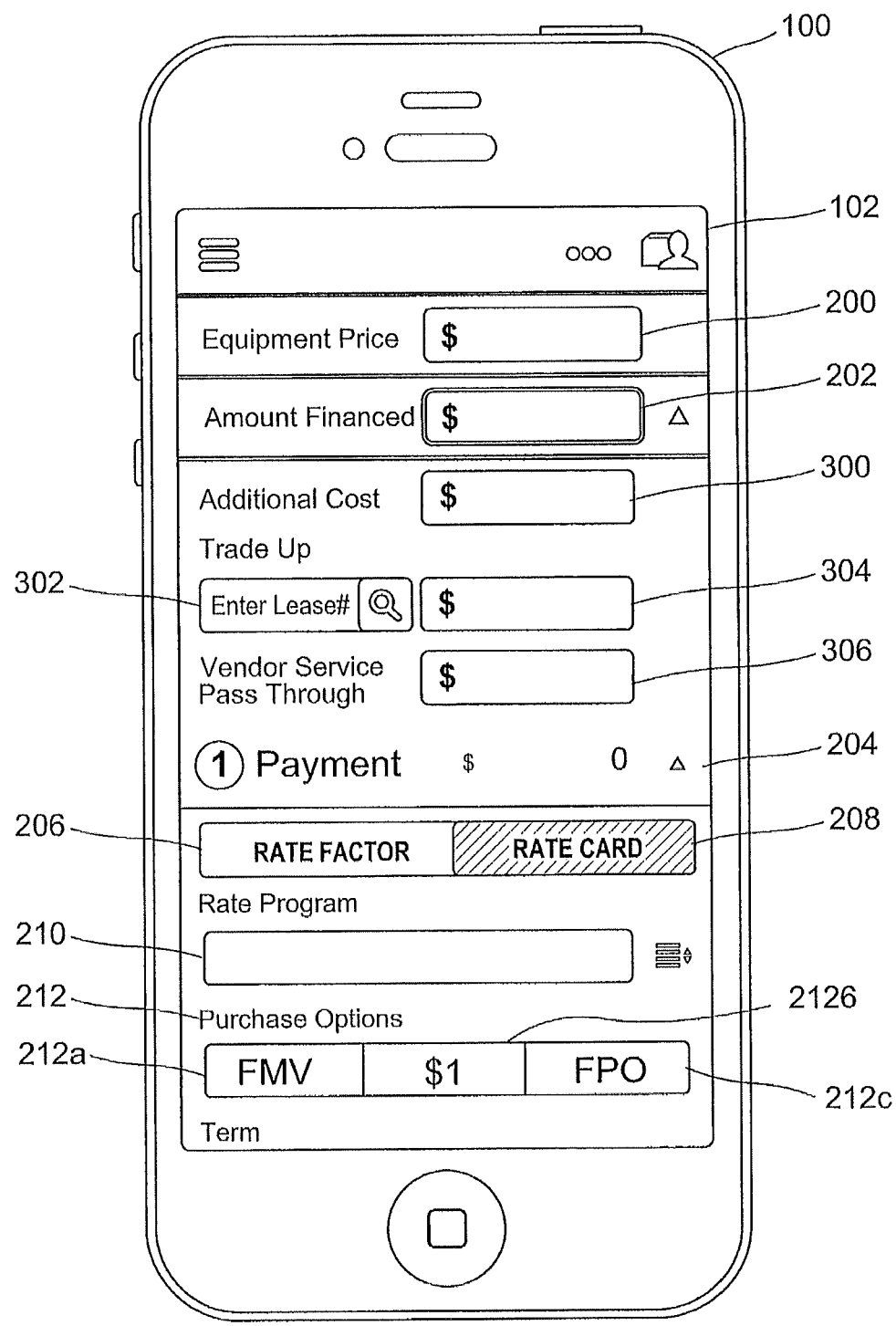
FIG. 3 illustrates an exemplary embodiment of a display page of the application for negotiating, generating, documenting, and fulfilling vendor financing opportunities.

FIG. 3 illustrates an exemplary display page of the mobile application that includes an additional cost field 300. Additional costs associated with the purchase or lease of the product and/or service can be inputted into the additional cost field 300. For example, if a copier is being financed, an additional cost that may be associated with the cost of the copier could be a service agreement, warranty extension contract, etc. In this example, the cost of the service agreement would be entered into the additional cost field 300. An exemplary embodiment of FIG. 3 also includes a trade up section which includes a lease number field 302. For example, if a product is currently being leased and the customer wants to trade-up or trade-in the current product, a lease number can be entered into the lease number field 302, and a value of the leased product (e.g., fair market value or some other value) can be auto-populated into the lease value field 304 by querying the pricing database 2912, or the contract database 2910 if the trade in price is dictated by a preexisting contract. Also, the selection of a lease number or quote can auto-populate the customer information fields with the customer name, address, and phone number, by the application accessing stored customer information in the customer database 2914. The trade-up value that is shown in the lease value field 304 can then be used to calculate the payment amount that is shown at the payment field 204 (e.g., the trade-up value can be applied as a credit to reduce the amount financed). Thus, the user of the application has real-time access to trade-up quotes. That is, the user has access to the current trade up value of the product that the customer would like to trade in, in this embodiment. In an exemplary embodiment, FIG. 3 also includes a vendor service pass through field 306 into which a dollar amount can be inputted. The dollar amount inputted into the vendor service pass through field 306 can also be used to calculate the payment amount which will be displayed at the payment field 204. In a non-limiting embodiment, if a search is performed for a trade-up using the lease number field 302 or another field, the search can be limited to the dealer's portfolio. Also, when using the trade-up feature, quote amounts can be validated, kept, and returned.

Figure 4:
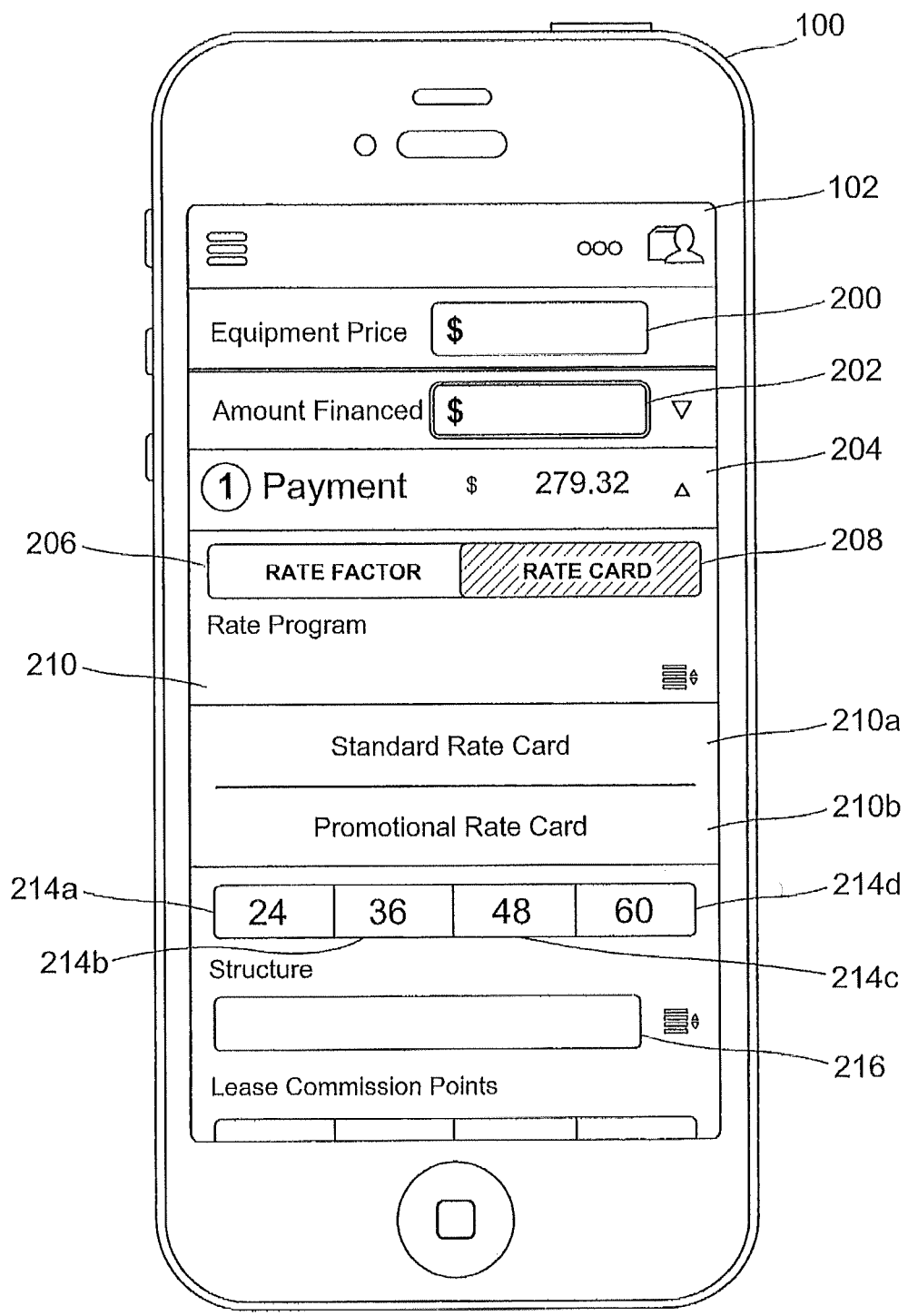
FIG. 4 illustrates an exemplary embodiment of a display page of the application for negotiating, generating, documenting, and fulfilling vendor financing opportunities.

After some or all of the fields shown in FIGS. 2 and 3 are completed and/or selected, a payment amount is displayed at the payment field 204 shown in FIG. 4. Thus, the mobile application makes it easy to use a computing device 100 to automatically calculate a payment amount based on various variables that can be inputted into the mobile application (such as equipment price, amount financed, purchase option, rate card, term of the financing or lease, payment structure, etc.) or accessed by the mobile application (e.g., stored pricing information, current rates, etc.).

Figure 4A:
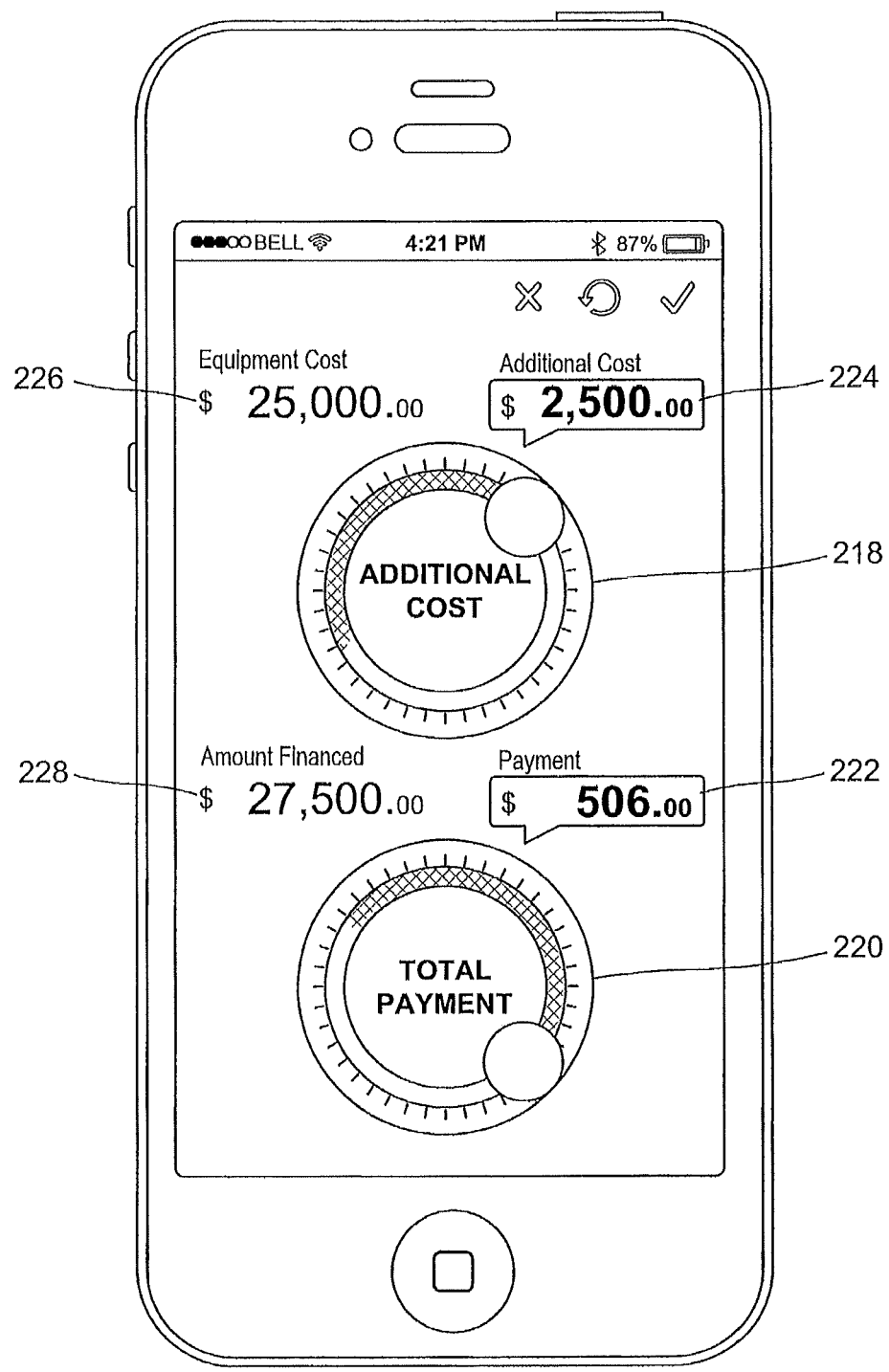
FIG. 4A illustrates an exemplary embodiment of a display page of the application for negotiating, generating, documenting, and fulfilling vendor financing opportunities.

FIG. 4A illustrates an exemplary display page of the mobile application entitled "Goal Seeker." After the inputs of the other application display pages are used to input critical transaction inputs, the resulting quote may not fit with the potential customer's desired structure, price point, etc. The user can use the illustrated two wheel dials 218, 220 on this display page to adjust the monthly payment 222 and/or the additional equipment cost/trade in value 224 to meet the desired structure of deal without having to go back and input a new series of variables. Movement of the dial 218, 220 adjusts the value of the corresponding variable based upon the amount the dial is moved. While two dials are shown to control two variables, another number of interdependent variables (e.g., 1, 3, 4 or more) can be controlled, and the controls can be in another graphical form, e.g., radial dials, slide scales, drop-down menus of values, and nearly any other graphic that allow for the relatively dynamic selection of values with corresponding changes in other related or dependent values being calculated and shown in real time or near real time.

Thus, the display page of FIG. 4A allows a user to easily see how varying one or more variables affects the values of other variables. In other words, the application can perform a multi-variable iterative process where one of more variables can be locked in. The variables can include: equipment cost, additional cost, amount financed, payment amount, finance rate, amount down, trade allowance (e.g., trade in value), any other variable described in this disclosure, etc. In an exemplary embodiment, one or more variables can be fixed at the same time.

For example, the interest rate could be fixed at a particular value (e.g., 4.49%) and the trade allowance could be fixed at a particular value (e.g., $0). Then, the equipment price could be varied to see how changing the equipment price affects the payment amounts. Similarly, for example, the payment amount could be fixed, and the trade allowance, the interest rate, and the total payment could be adjusted to see how varying one variable affects the other two variables. Many different variable combinations are possible.

In another example, the equipment cost 226 and the amount financed 228 could be fixed, and additional cost 224 could be varied via the dial 218 to see how the change affects the payment amount 222, and the payment amount 222 could be varied via the dial 220 to see how the additional cost amount 224 is affected.

FIG. 5 illustrates an exemplary display page of an application that also includes the payment field 204. However, unlike FIG. 4, the payment field 204 of FIG. 5 also displays the payment term and the rate that is being applied in calculating the payment amount. The exemplary display page of FIG. 5 shows that the rate card selection button 208 has been selected between a rate factor and a rate card, though the invention is not limited to these two options. Under the rate program, a standard rate card has been selected from a plurality of predefined rate cards via a rate program selection dropdown menu 210. An exemplary rate factor would be 0.02190, which represents the daily interest rate factor for the transaction. An exemplary rate card would contain a number of rate factors based on the purchase option, the term of the contract and the amount financed among other factors. Other rate card structures and programs are apparent to those skilled in the art. The rate cards, which can be stored in the pricing database 2913, can be automatically updated and retrieved by the mobile application. FIG. 5 also illustrates that the fair market value purchase option 212a and a contract term of 36 months 214b has also been selected. Based on these selections, the equipment price entered into the equipment price input field 200, and amount financed entered into the amount financed input field 202, and possibly other data, the payment amount can be calculated using algorithms that multiply the amount financed by the selected rate factor or rate card and term, as determined by the selected purchase option, the selected term, and the selected structure and other variables, and shown in the payment field 204. The actual algorithms can be varied and various algorithms are apparent to those skilled in the art.

A payment structure area 216 in FIG. 5 can show that a 90-day deferred option is selected, meaning that the initial payment will be deferred for 90 days. However, a zero advance option can also be selected in the payment structure area 216, and other options for the initiation of the contract are apparent to those skilled in the art.

Figure 6:
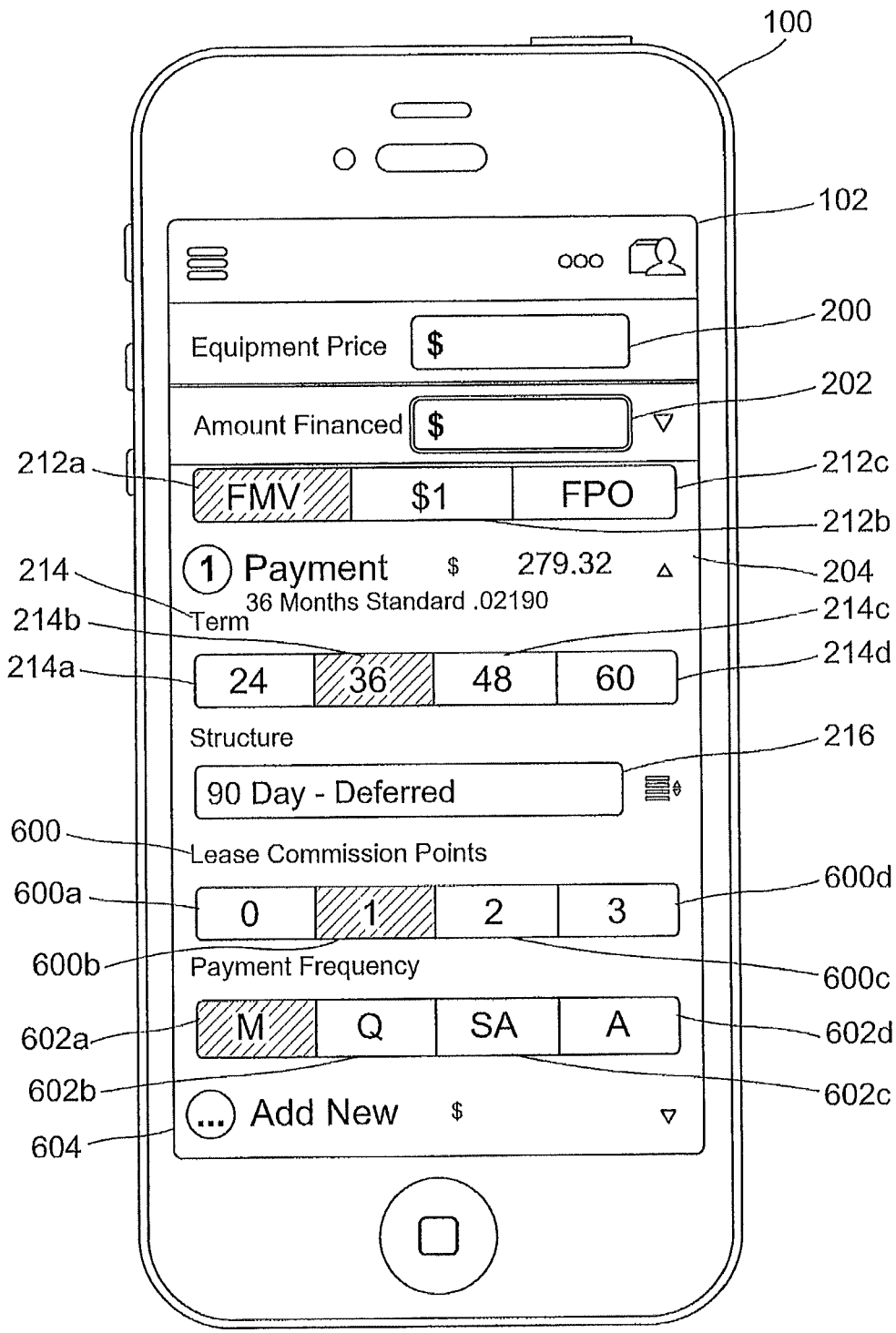
FIG. 6 illustrates an exemplary embodiment of a display page of the application for negotiating, generating, documenting, and fulfilling vendor financing opportunities.

FIG. 6 illustrates an exemplary display page the mobile application that can include a lease commission points area 600. The lease commission points area 600 includes a zero point selection 600a, a one point selection 600b, a two point selection 600c, and a three point selection 600d in this example, but other point selections are possible. This can allow the financing person to factor in what the vendor's representative is willing to make or sacrifice by way of adjusting the vendor's commission in making the financing. FIG. 6 shows that the one point selection 600b has been selected, as it is highlighted, for example, in order for it to be distinguished from the other selections.

In an exemplary embodiment, FIG. 6 also includes a payment frequency area 602. The payment frequency area 602 includes a monthly payment frequency selection item 602a in which monthly payments are to be made throughout the year (i.e., 12 payments a year). Payment frequency area 602 also includes a quarterly payment frequency selection item 602b in which payments are to be made every three months (i.e., 4 payments a year). The payment frequency area 602 also includes a semi-annual payment frequency selection item 602c in which payments are to be made every six months (i.e., 2 payments a year). The payment frequency area 602 can also include an annual payment frequency selection item in which payments are to be made yearly (i.e., 1 payment a year). These are common examples, but others are possible, and of course are used to calculate the payments. In addition to the algorithms identified above, the frequency can be used as a weighted risk factor in case credit is being extended, e.g., when payments are due for past activity rather than the next payment period. The payment frequency selection item that is currently selected is shown as highlighted, in order to distinguish the selected payment frequency selection item from the other payment frequency selection items. For example, FIG. 6 shows that the monthly payment frequency selection item 602a is selected, and used to calculate the payment amount shown at the payment field 204.

In an exemplary embodiment, FIG. 6 shows an add new payment calculator button 604, which allows a user to calculate a second payment quote, which can be used for comparison with the payment quote at the first payment field 204 that was previously calculated. Once the add new payment calculator button 604 is selected, the page shown in FIG. 7 can be displayed.

Figure 7:
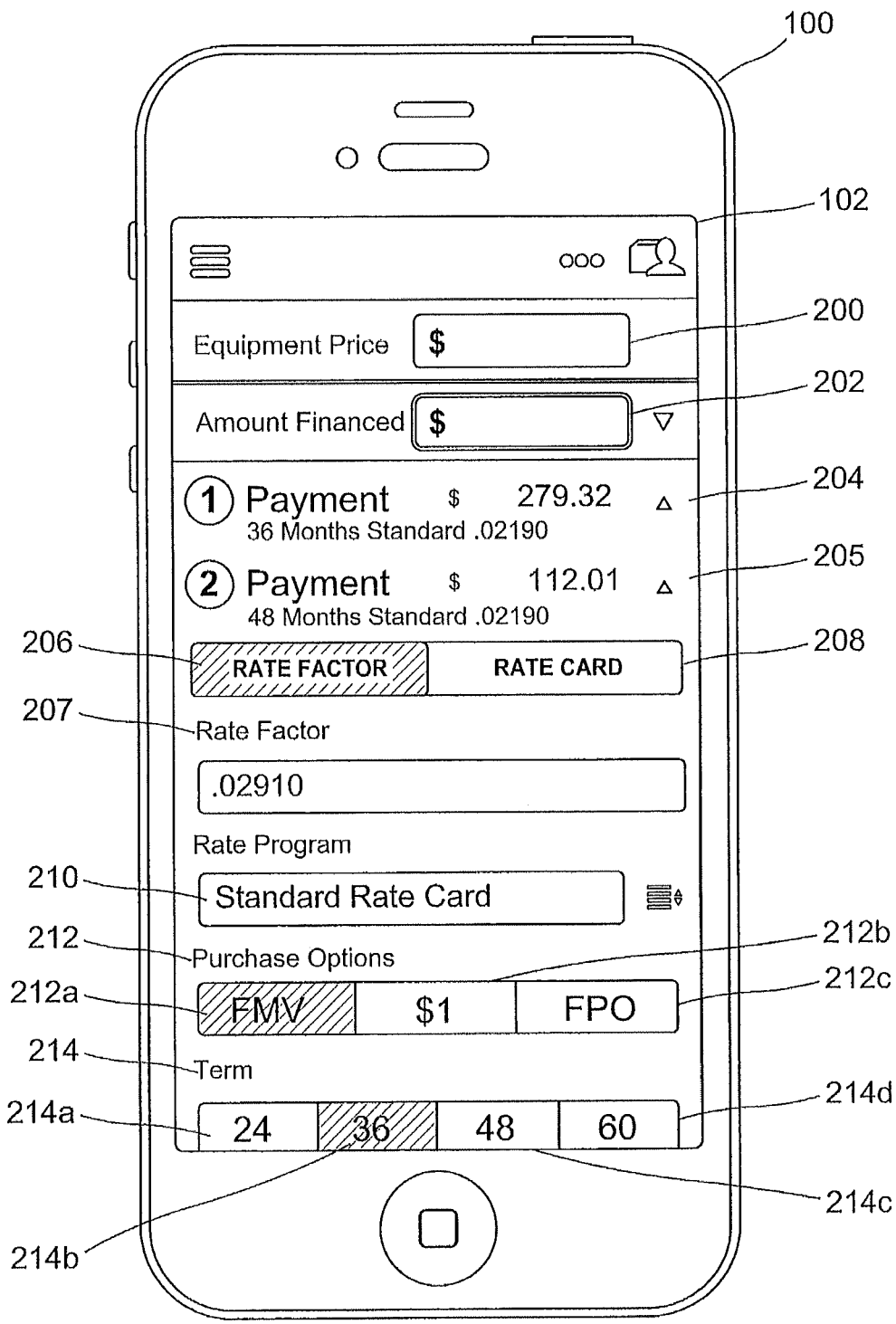
FIG. 7 illustrates an exemplary embodiment of a display page of the application for negotiating, generating, documenting, and fulfilling vendor financing opportunities.

FIG. 7 illustrates an exemplary display page of the mobile application that can include the payment field 204 which shows a calculated monthly payment of $279.32 which is calculated based on a 36-month term and a standard rate card of 0.02190. FIG. 7 also shows a second payment field 205 showing a calculated monthly payment of $112.01 which is calculated based on a 48-month term and the standard rate card of 0.02190. Below the second payment field 205, multiple selection items are displayed that are used to calculate the monthly payment associated with the second payment field 205. For example, FIG. 7 shows a rate factor selection button 206, a rate card selection button 208, and a rate factor input field 207, in which the user can input a specific rate factor. For example, in FIG. 7, the rate factor is 0.02910, but can be modified by the user by touching the rate factor input field 207 on a touchscreen of the computing device 100, and typing in or selecting a new rate factor. The exemplary display page of FIG. 7 also includes the purchase options area 212 and the payment term area 214 that were also shown in FIG. 5. By changing from rate factor to rate card and vice versa, and selecting one of the plurality of predetermined values or inputting values for either, as well as selecting a term, and purchase options, the payment option amounts 204 and 205 can be dynamically calculated and displayed in real time to facilitate finding a financing acceptable to the lessor.

Figure 8A:
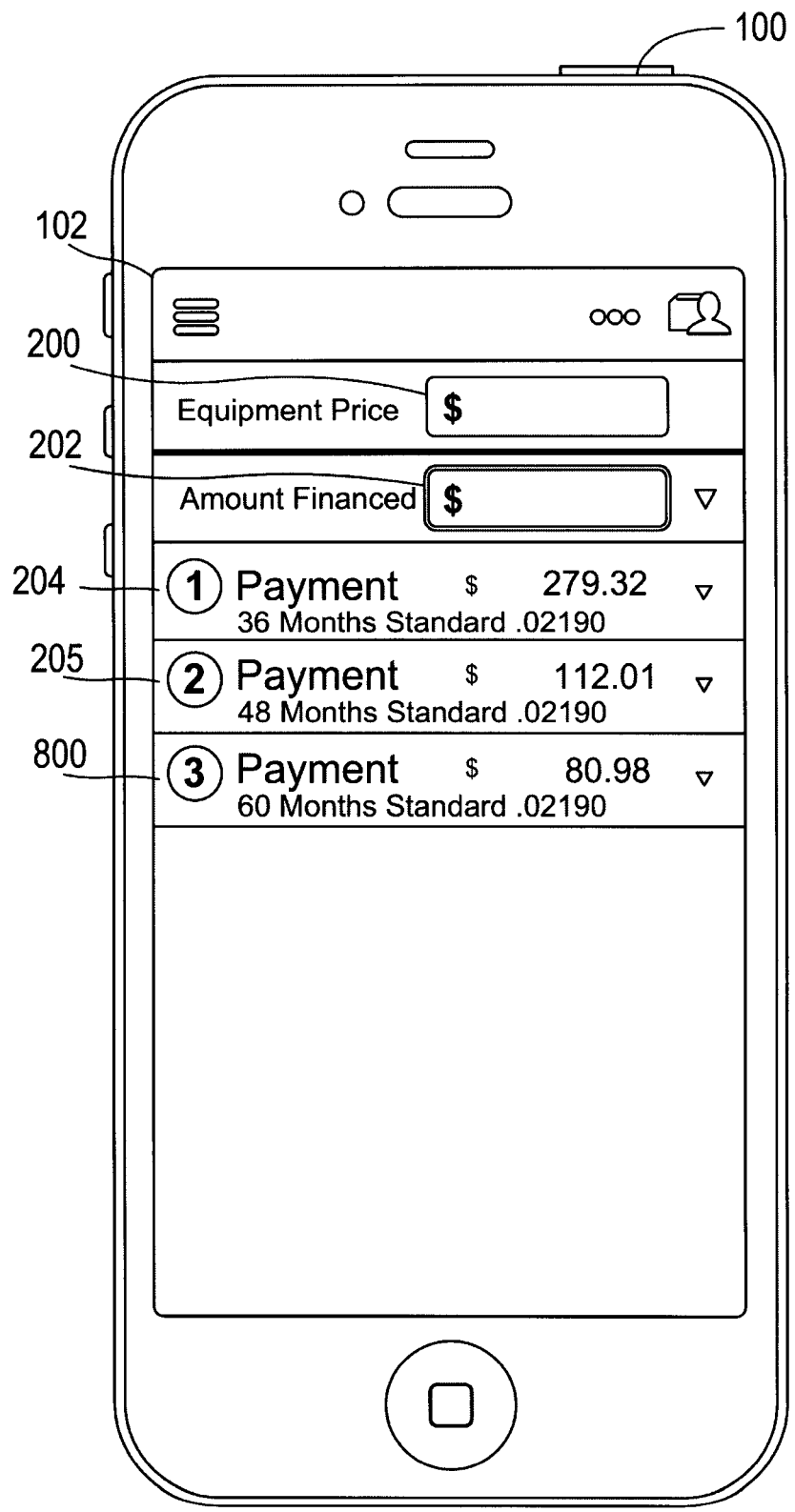
FIGS. 8A and 8B illustrate exemplary embodiments of display pages of the application for negotiating, generating, documenting, and fulfilling vendor financing opportunities.
Figure 8B:
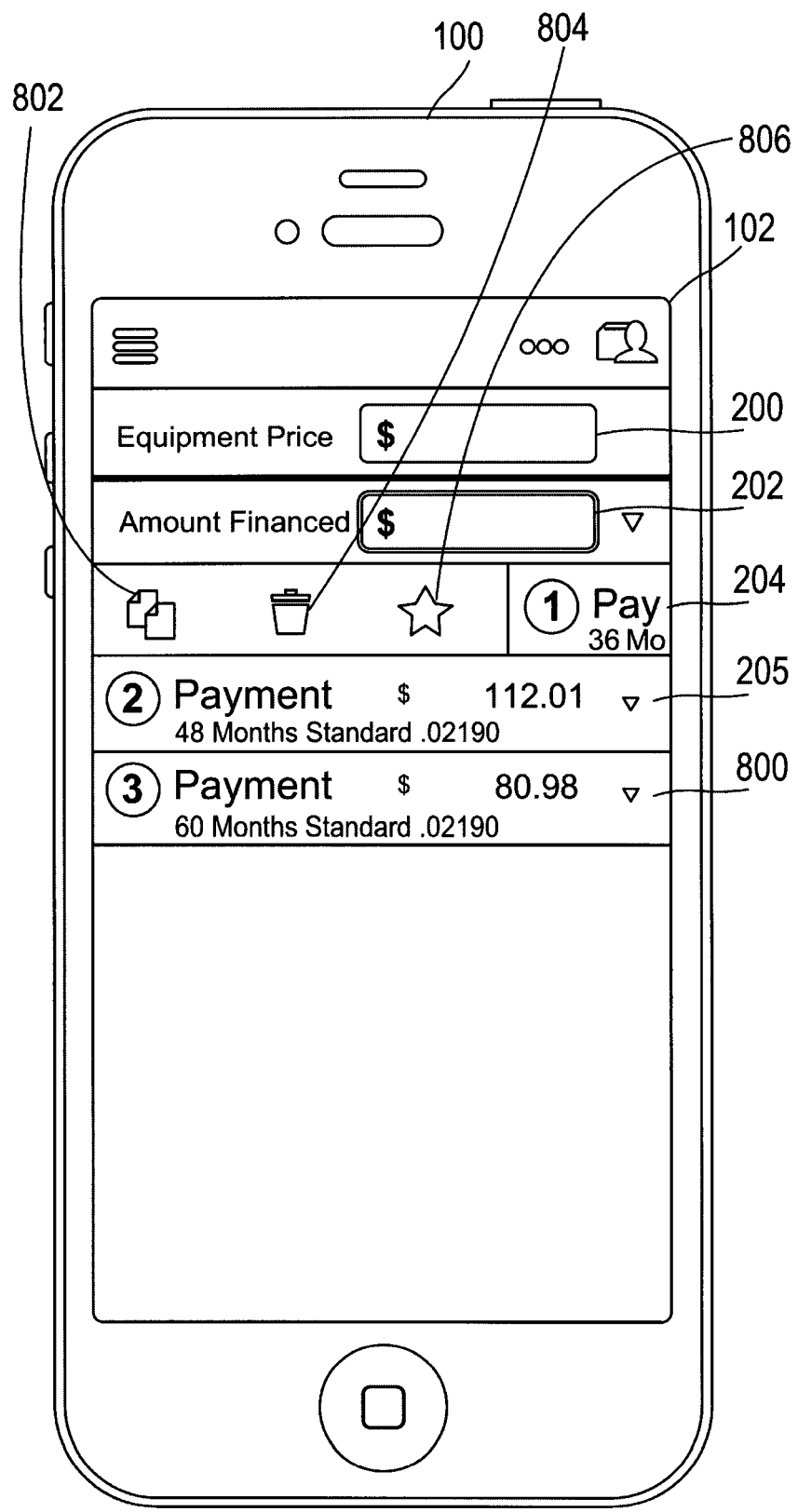

FIGS. 8A and 8B illustrate exemplary display pages of the mobile application that can show three different calculated payment amounts simultaneously. The first calculated payment amount is displayed at the payment field 204, the second payment amount is displayed at the second payment field 205, and the third calculated payment amount is displayed at the third payment field 800. Each of the three payment fields show the calculated payment amount, the contract term used in the calculation of the payment, and the rate program and rate factor that is used in the calculation of the payment. Thus, a user can easily determine which payment option is best for them.

The exemplary display page shown in FIG. 8B shows how a user can perform various functions with the payment quote shown at the payment field 204. For example, by dragging the payment field 204 to the right across the screen of the computing device 100, three icons are exposed and displayed. More or less than three could be exposed depending on the implementation. A copy button 802 allows the payment quote at the payment field 204 to be copied. A delete button 804 allows the payment quote at the payment field 204 to be deleted. A star button 806 allows the payment field 204 to be saved as a favorite. Also, in an exemplary embodiment, selecting the star button 806 may cause the payment quote at the payment field 204 to be selected, and used for further operations, functions, calculations, etc.

Figure 9A:
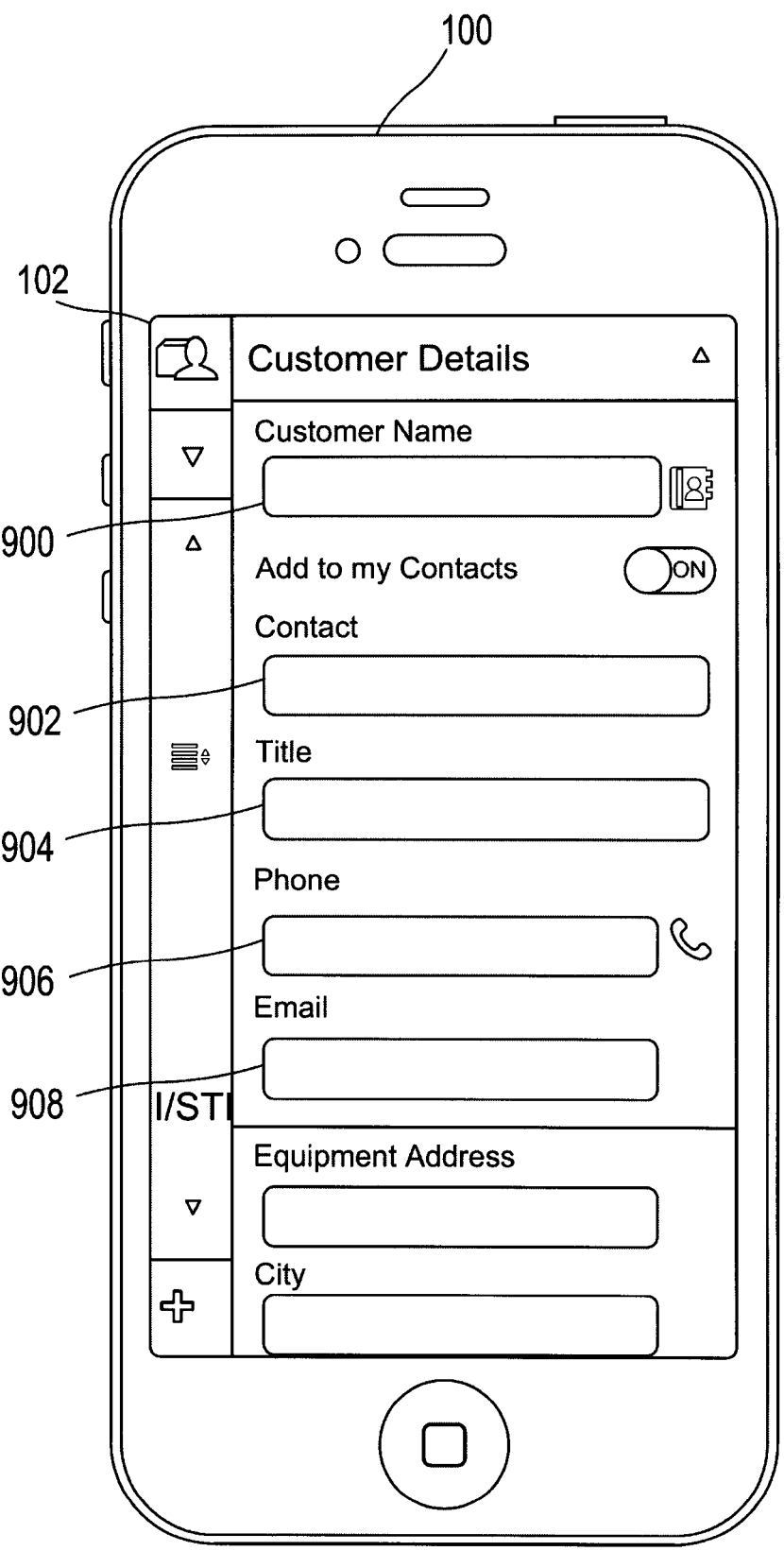
FIGS. 9A and 9B illustrate exemplary embodiments of display pages of the application for negotiating, generating, documenting, and fulfilling vendor financing opportunities.
Figure 9B:
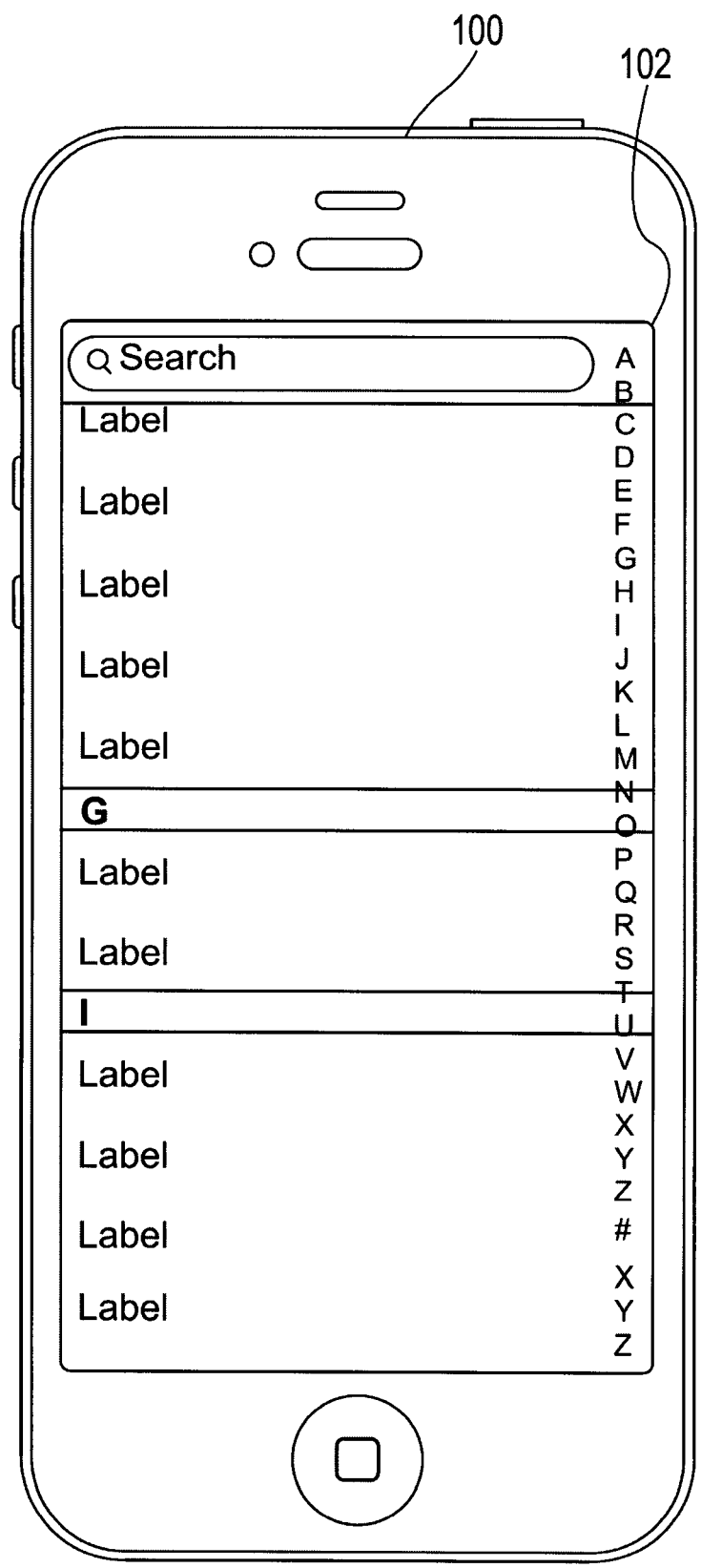
Figure 29:
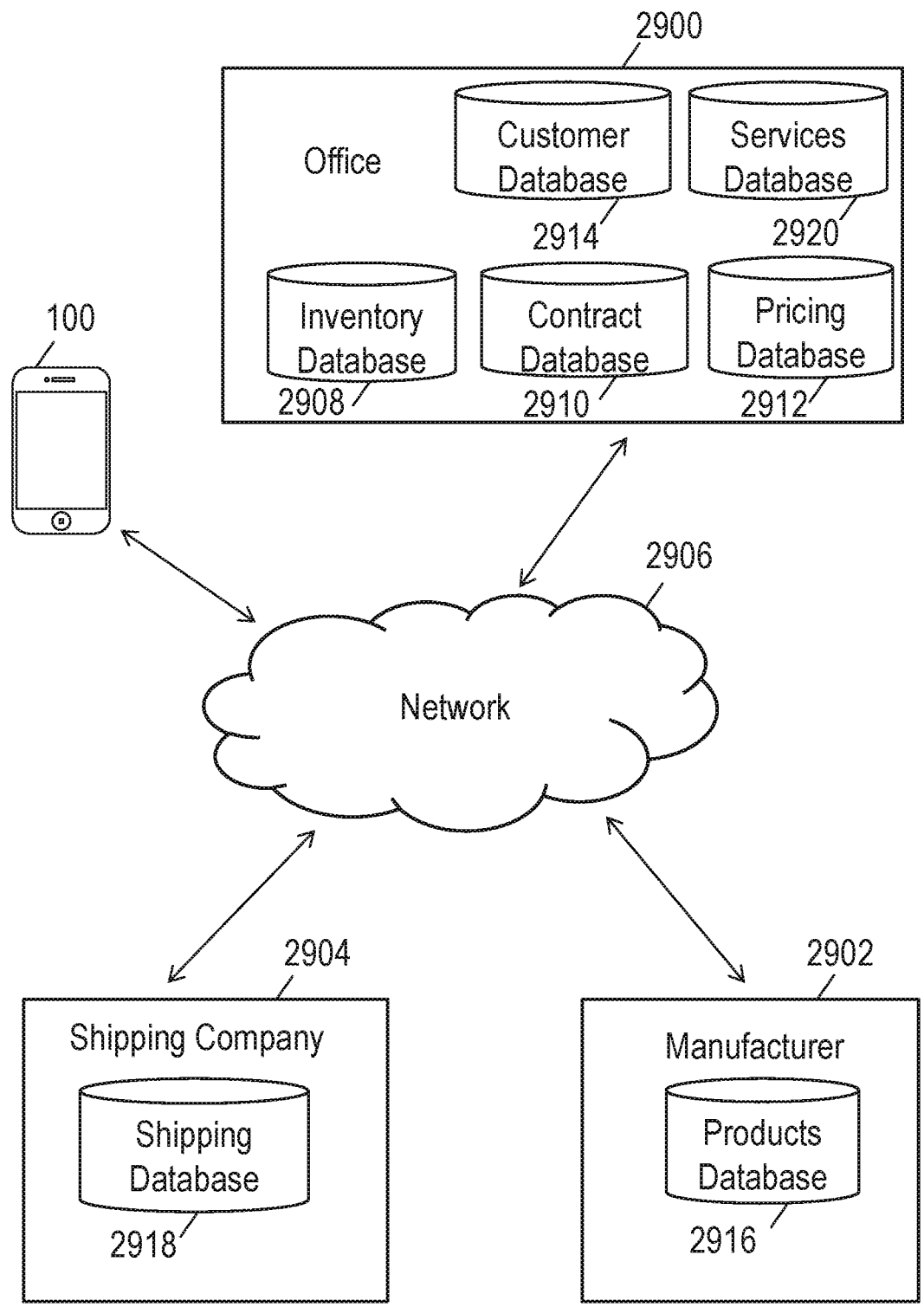
FIG. 29 is a diagram illustrating a system in accordance with an exemplary embodiment.

FIGS. 9A and 9B illustrate exemplary display pages of the mobile application that can include customer contact information. In an exemplary embodiment, the display screen shown in FIG. 9A includes a customer name field 900, and various additional information associated with a customer identified in the customer name field 900. A contact field 902 can store a contact (e.g. a particular representative) that is associated with the customer that is displayed at the customer name field 900. A customer title field 904 is a field that can accept and identify the title of the contact person that is shown at the contact field 902. A phone field 906 can receive and identify phone information associated with the contact or the customer. Similarly, an email field 908 can receive and identify email information associated with the contact or the customer. Once the customer information has been inputted into the display screen shown in FIG. 9A, the customer information can be added to a contact list, as shown in the display page in FIG. 9B. Thus, the contact information of a customer can be saved and easily accessed in the future, optionally both locally on the computing device 100, and as transmitted and saved in the contracts database 2910 of the office 2900 (FIG. 29).

Figure 10:
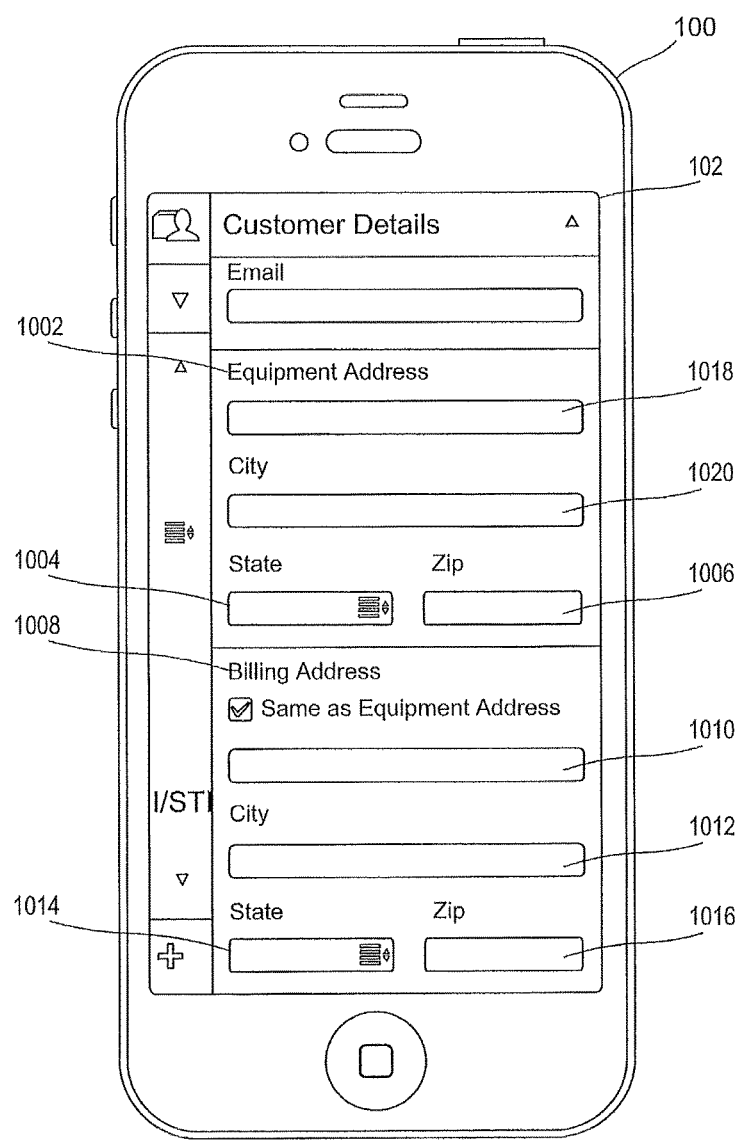
FIG. 10 illustrates an exemplary embodiment of a display page of the application for negotiating, generating, documenting, and fulfilling vendor financing opportunities.

FIG. 10 illustrates an exemplary display page of the mobile application that includes information regarding an equipment address and a billing address that are associated with the customer identified at the customer name field 900. For example, FIG. 10 includes an equipment address area 1002 that stores the address where the financed or leased equipment is located at. The equipment address area 1002 includes a street address field 1018, a city field 1020, a state field 1004, and a zip code field 1006. FIG. 10 can also include a billing address area 1008 which includes a billing street address field 1010, a billing city field 1012, a billing state field 1014, and a billing zip code field 1016.

Figure 11:
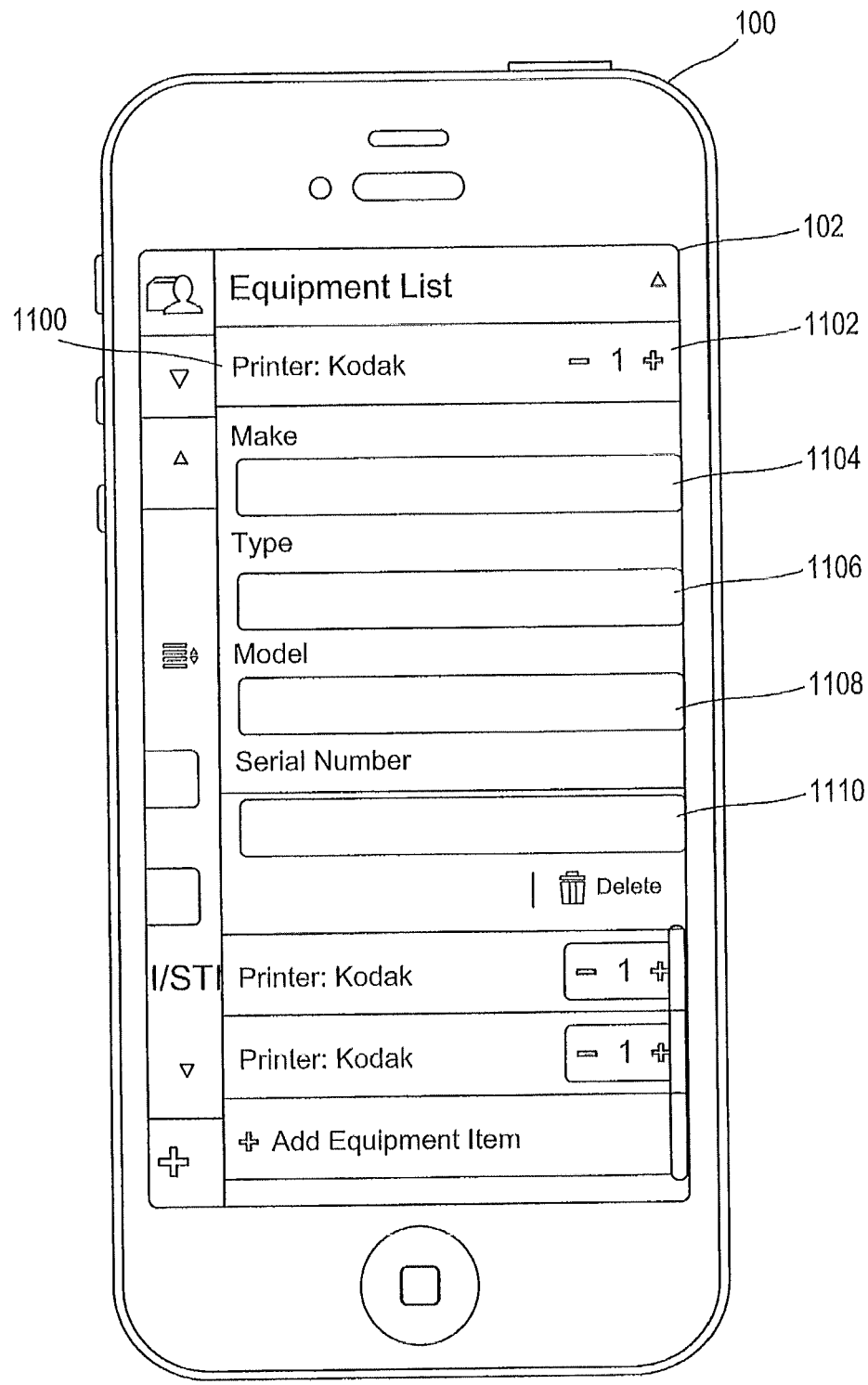
FIG. 11 illustrates an exemplary embodiment of a display page of the application for negotiating, generating, documenting, and fulfilling vendor financing opportunities.

FIG. 11 illustrates an exemplary display page of the mobile application that includes an equipment identification field 1100 that can identify the equipment by name, type, brand, etc. For example, FIG. 11 shows that the equipment identification field 1100 identifies a piece of equipment as a printer (e.g. type of equipment) by Kodak (e.g. by brand). FIG. 11 also includes an equipment quantity field 1102, in which a user can select and modify the quantity of equipment. For example, in FIG. 11, one Kodak printer is selected. FIG. 11 also includes an equipment make field 1104, into which a user can input the make of the equipment. FIG. 11 also includes an equipment type field 1106, in which the user can enter the type of equipment. FIG. 11 also includes an equipment model field 1108, in which the user can enter the model information of the equipment. FIG. 11 also includes an equipment serial number field, in which the user can enter the exact serial number of the equipment. The serial number may be useful to have for warranty or service purposes. This information can be manually entered, but preferably would be transmitted from the equipment inventory database 2908 (FIG. 29). This might be auto-populated by a first-in, first-out or other convention for inventory control, and/or involve human intervention is selecting the equipment to be delivered under the contract being formed. Of course, this would normally be updatable information, such as when and if the equipment is replaced, etc.

Figure 12:
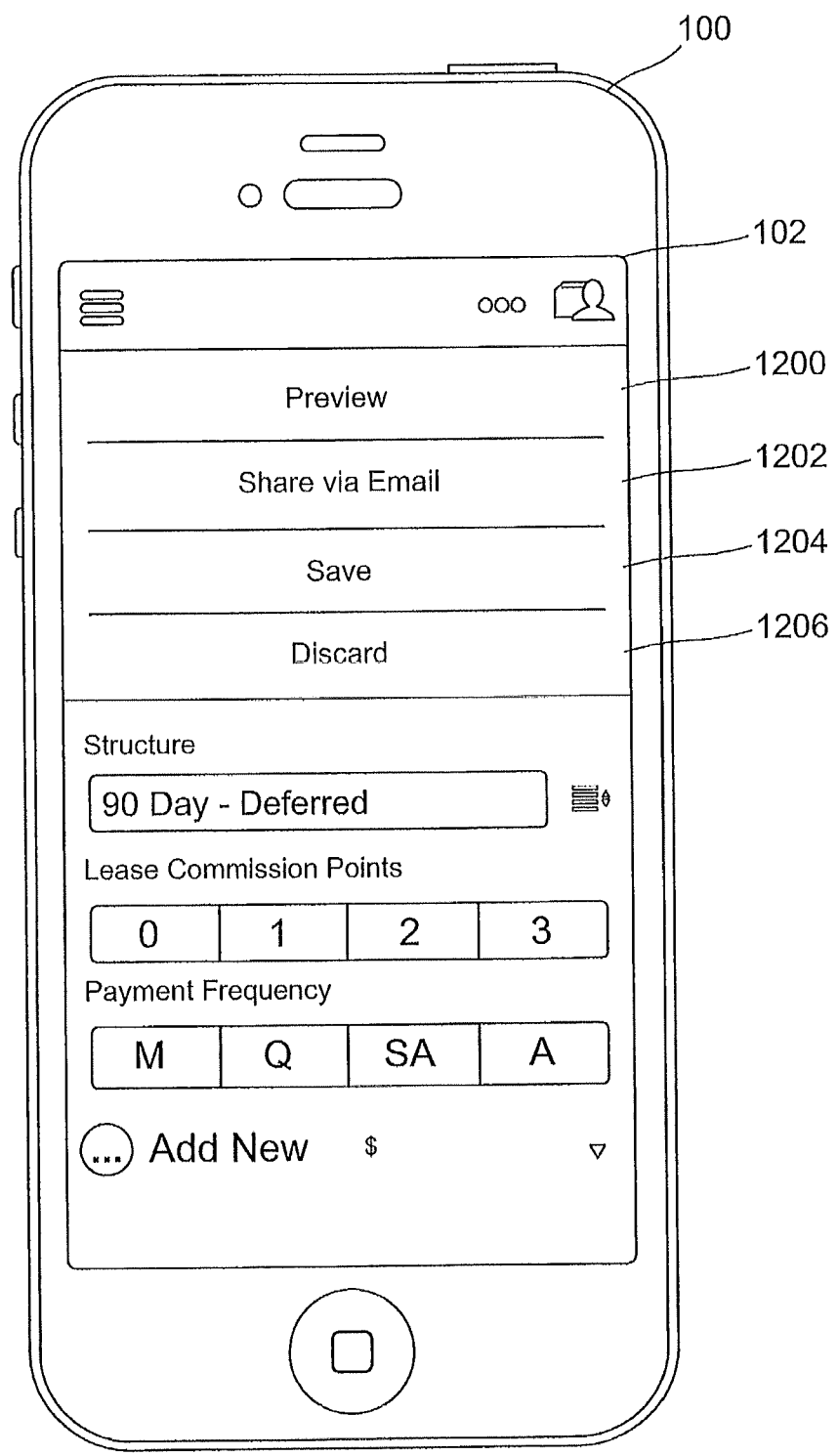
FIG. 12 illustrates an exemplary embodiment of a display page of the application for negotiating, generating, documenting, and fulfilling vendor financing opportunities.

FIG. 12 illustrates an exemplary display page of the mobile application that includes several options for utilizing the quote information or other information that has been generated by the application using the previous display pages shown, for example, in FIGS. 1-11. FIG. 12 can include a preview button 1200, which when pressed by the user will generate a preview of information that was previously inputted into the application (e.g., a payment quote). FIG. 12 also includes a share via email button 1202, which allows the user to share the quote information or other information generated by the application with other people. FIG. 12 can also include a save button 1204, which allows the user to save the quote information or other information generated by the application. In addition, FIG. 12 can include a discard button 1206, which allows the user to delete the quote information or other information generated by the application.

Customer View Mode

Figure 13:
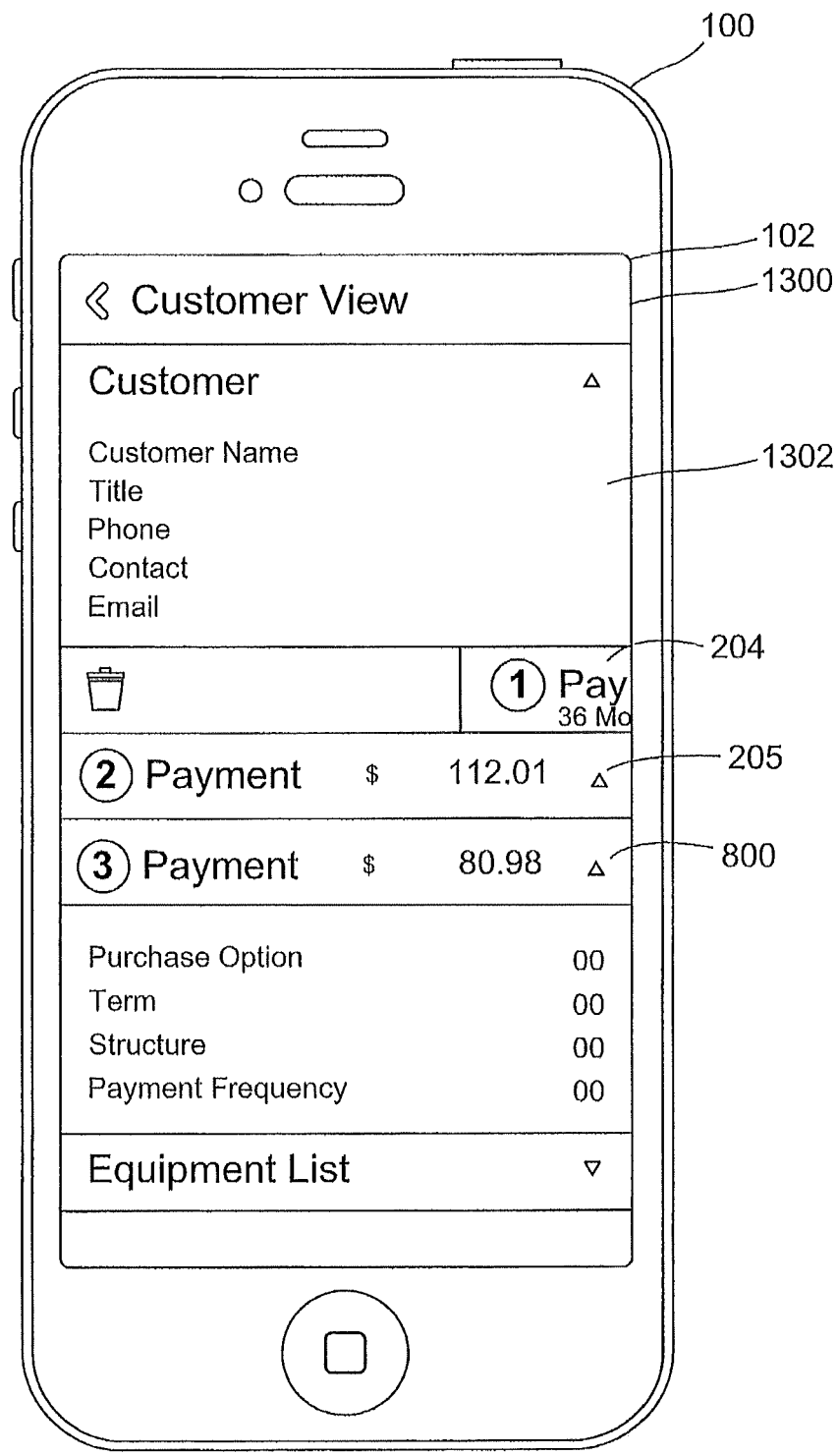
FIG. 13 illustrates an exemplary embodiment of a display page of the application for negotiating, generating, documenting, and fulfilling vendor financing opportunities.

A customer view mode of the application will now be explained with reference to FIGS. 13-18. The customer view is a view that is displayed by the mobile application that is intended to be viewed by the customer, and does not display any information that the user (e.g. vendor, salesman, etc.) would not want the customer to see. FIG. 13 includes a customer view banner 1300 which indicates that the mobile application is displaying the customer view. The customer view banner 1300 makes it easy for the user of the application to determine if the mobile application is in the customer view mode. In an exemplary embodiment, FIG. 13 includes a customer information display area 1302, which displays important information associated with the customer, such as the customer name, title of the customer or contact, phone number of the customer or contact, contact person, and email address of the customer or contact. The information that is shown in the customer information display area 1302 can be based on the information that was inputted into the display screens of FIGS. 9A and 9B. Specifically, the contact field 902, the customer title field 904, the phone field 906, and the email field 908. Also, the information that is shown in the customer information display area 1302 can be based on previously stored information that the application can access.

The display screen of FIG. 13 can also display one or more payment quotes. For example, a first payment quote shown at the payment field 204, a second payment quote shown at the second payment field 205, and a third payment quote shown at the third payment field 800. FIG. 13 can also include the purchase option, term, structure, and payment frequency selections that have been made to create one or more of the payment quotes.

Figure 14:
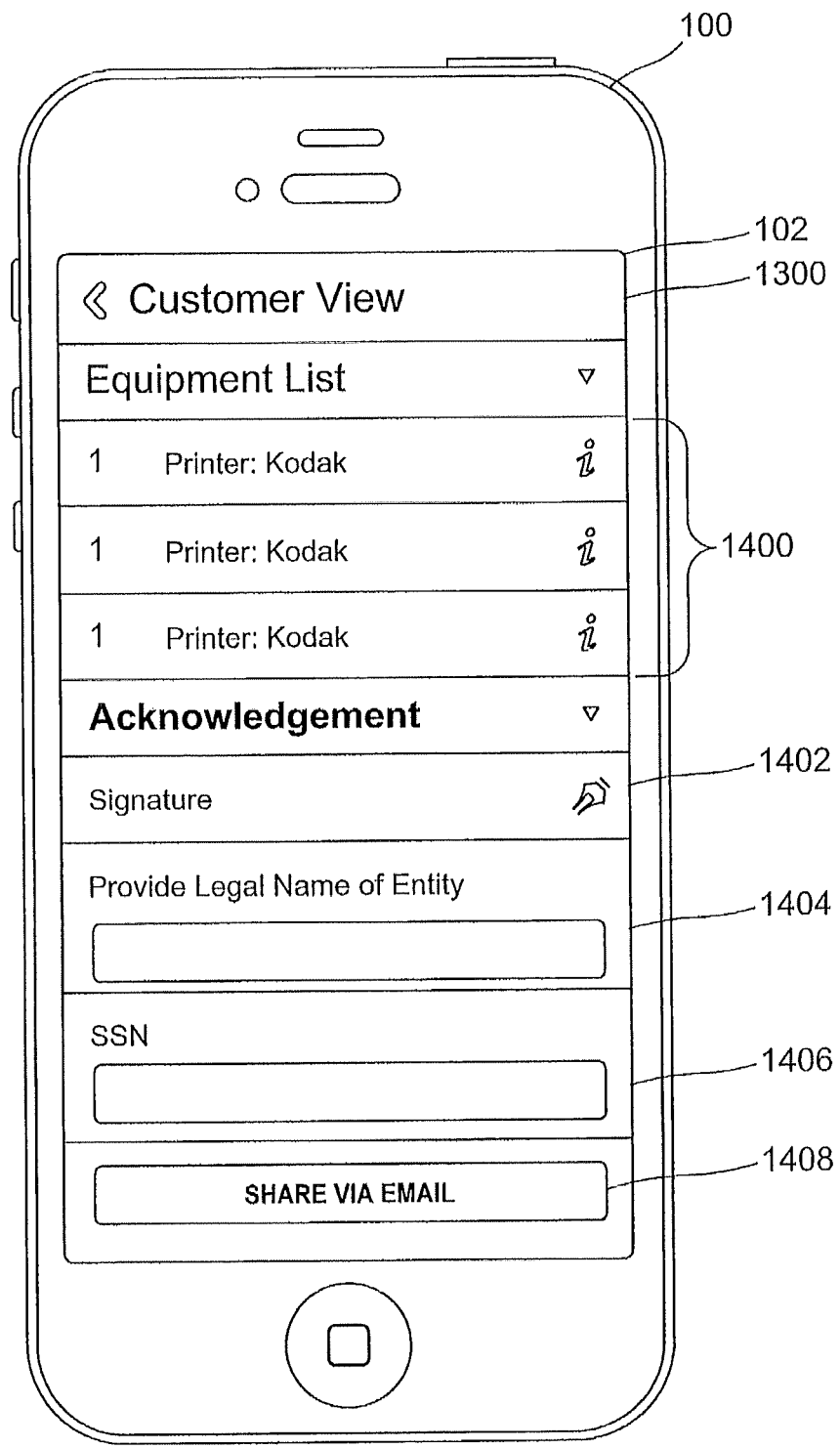
FIG. 14 illustrates an exemplary embodiment of a display page of the application for negotiating, generating, documenting, and fulfilling vendor financing opportunities.
Figure 15:
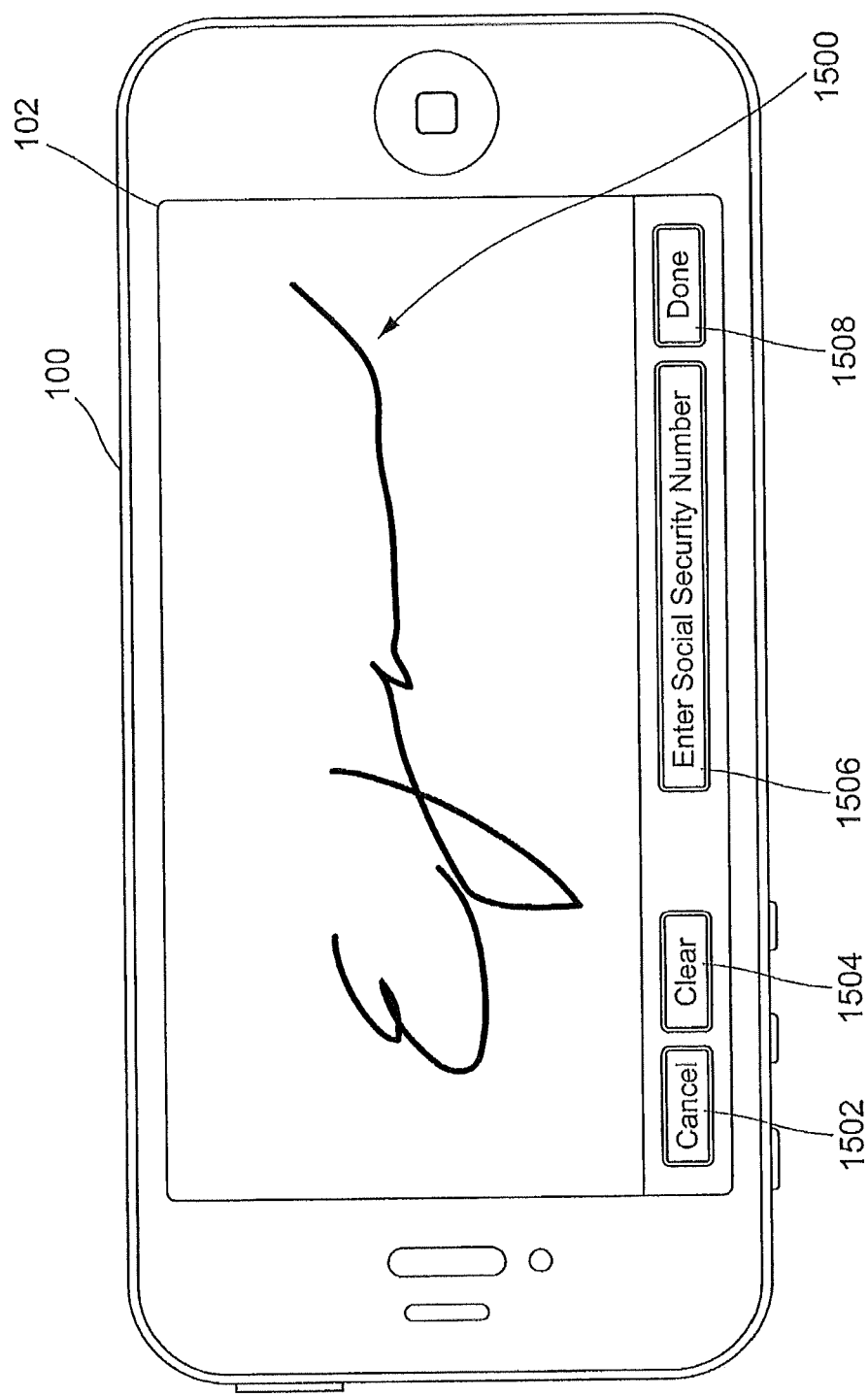
FIG. 15 illustrates an exemplary embodiment of a display page of the application for negotiating, generating, documenting, and fulfilling vendor financing opportunities.

FIG. 14 illustrates an exemplary display page of the mobile application that includes an equipment list area 1400, which lists various pieces of equipment that are to be leased or financed, along with the quantities associated with the various pieces of equipment. Though not shown in FIG. 13 or 14, options for printing, transmitting (e.g., e-mailing) to the customer and/or displaying the displayed terms as a summary of the contract, or optionally the complete contract itself, can be used to facilitate review by the customer, similar to that shown in FIG. 19. FIG. 14 also includes an acknowledgement section in which the customer can acknowledge that they have reviewed the terms of the lease or purchase contract, and execute the lease or purchase of the equipment or services. In an exemplary embodiment, the acknowledgement section includes a signature button 1402, which when selected by the user, brings up a signature page as shown in FIG. 15. The signature page shown in FIG. 15 will be discussed in greater detail below. The acknowledgement section in FIG. 14 also includes a legal name field 1404, in which the customer or user will enter in the legal name of the entity that will lease or purchase the product and/or services. FIG. 14 also includes a social security number field 1406, in which the customer or user will enter in the social security number of the customer. Lastly, the display page of FIG. 14 can include a share via email icon 1408, which when selected, can share the lease or purchase information via email to one or more email addresses.

Figure 16:
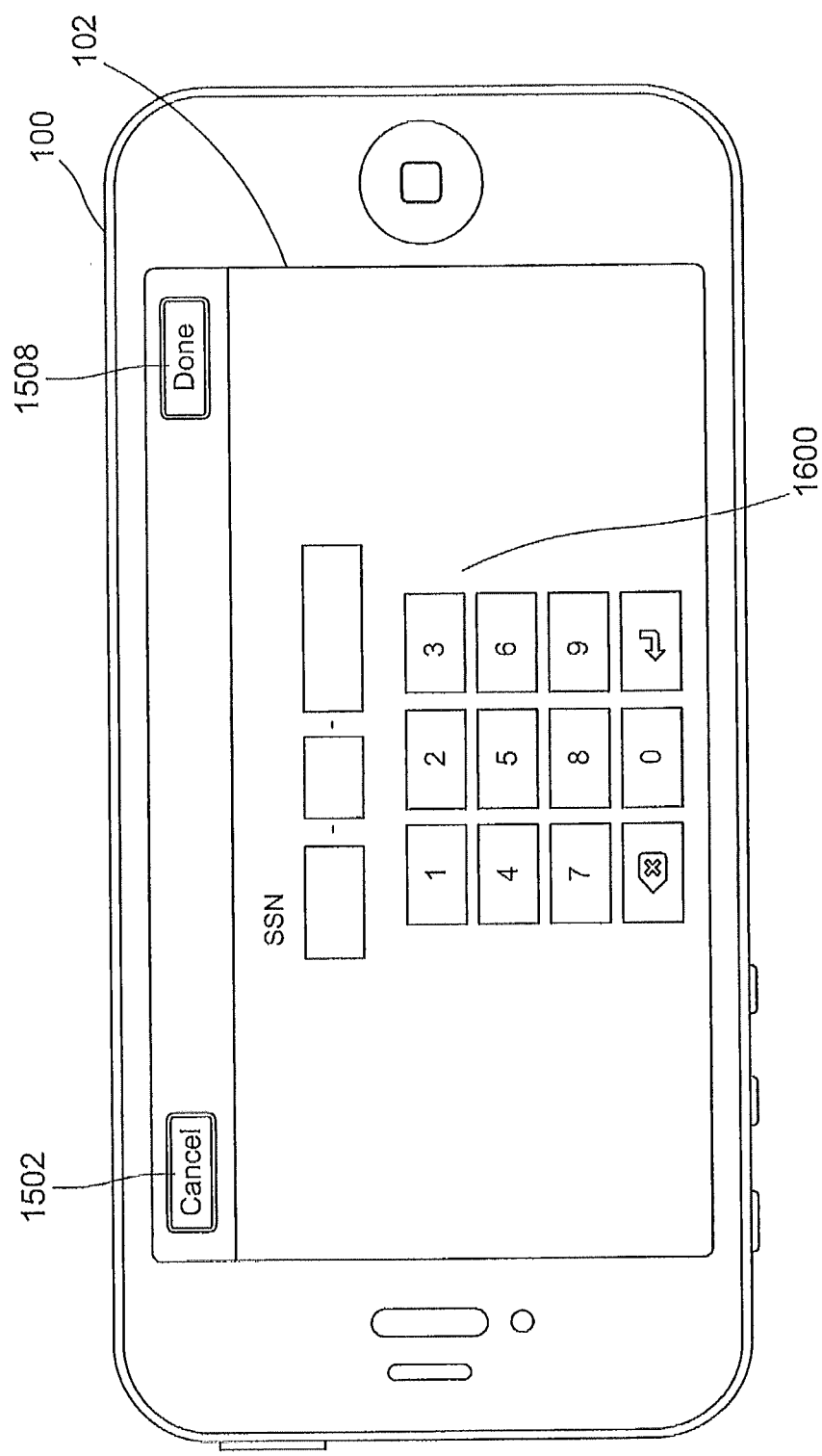
FIG. 16 illustrates an exemplary embodiment of a display page of the application for negotiating, generating, documenting, and fulfilling vendor financing opportunities.

FIG. 15 illustrates an exemplary display page of the mobile application in which a customer can enter in their signature to accept the lease or purchase of the product and/or services. On the display screen 102, the customer creates their signature 1500 by using their finger on the touchscreen or using a special pen that is designed to work on the touchscreen. FIG. 15 also includes a cancel button 1502, which when pressed, will cancel the display of the signature page, and will cause the application to go back to a previous page. FIG. 15 also includes a clear button 1504, which when pressed, will clear the signature on the display screen 102. FIG. 15 can also include an enter social security number button 1506, which when pressed, brings up a display page as shown in FIG. 16, which will be discussed in detail below. Lastly, after the customer has created their signature, and is satisfied with the signature, they can select the done button 1508. When the done button 1508 is selected, the signature will be saved and can be used to create a binding contract for the purchase or lease of a product and/or service.

FIG. 16 illustrates an exemplary display page of the mobile application that includes a numeric keypad 1600, which allows a customer to enter in their social security number by pressing the appropriate numbers within the numeric keypad 1600. After the customer has entered in their social security number, the customer will select the done button 1508 if they have entered in the correct social security number, or they can exit out of this display screen by selecting the cancel button 1502. The social security number (or other customer information such as a driver's license number, date of birth, etc.) can be used to perform a credit and compliance check electronically through the application. The display page of FIG. 16 allows for the quick and accurate capture of the customer information that is necessary for the credit and compliance check. In an exemplary embodiment, during the credit check process or at another time, an automated email can be generated from a template email (that is stored on the computing device 100 or a database in the office 2900) by information being auto-populated into predefined fields of the template email. After the email is generated, it is sent to a destination email address (e.g., a stored email address associated with a dealer), and the email can contain a PDF copy of the signed contract/deal, all credit information, and/or all data entered into the mobile application. In an exemplary embodiment, the automated email can be sent upon completion of the customer signature.

Figure 17:
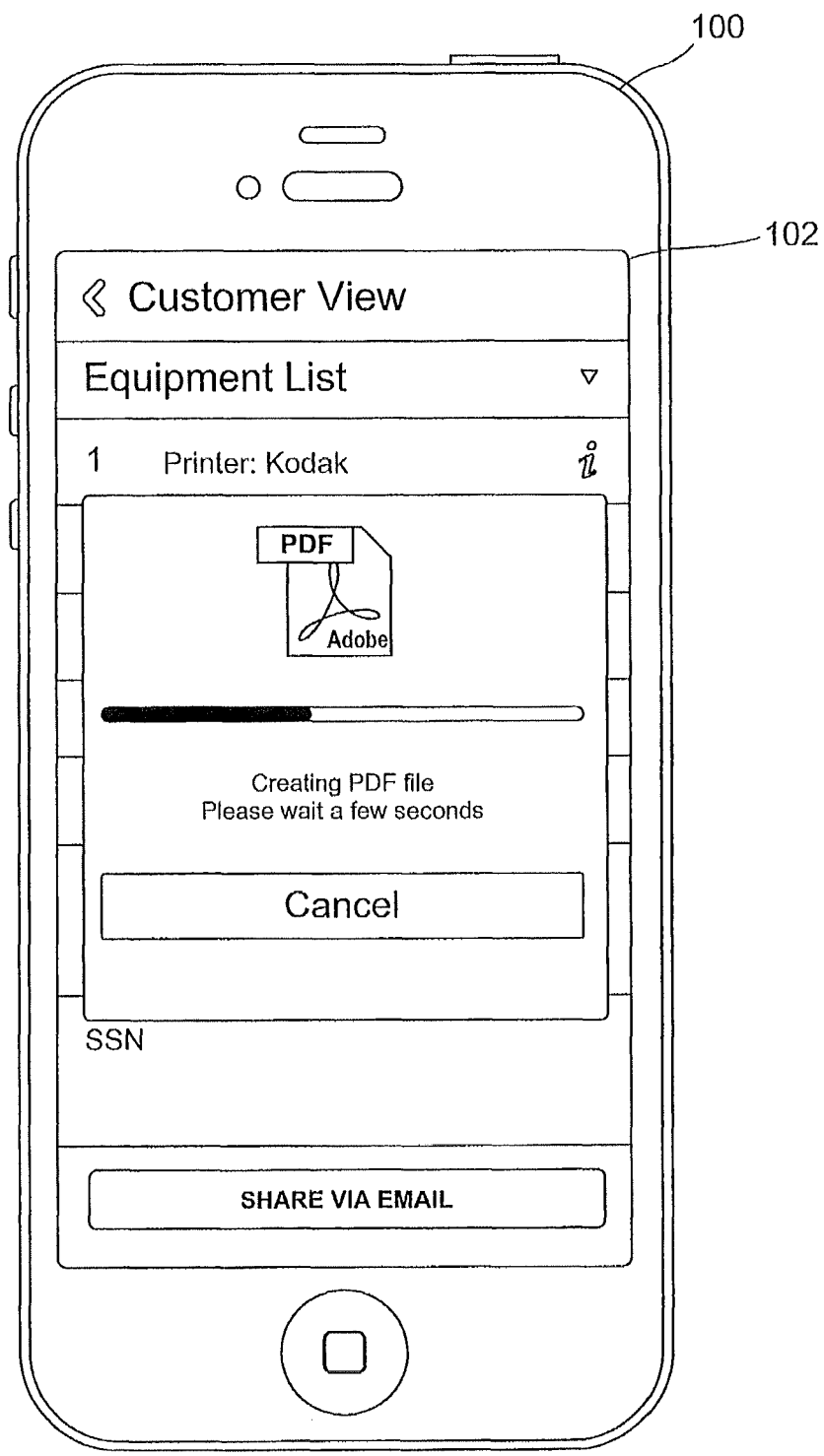
FIG. 17 illustrates an exemplary embodiment of a display page of the application for negotiating, generating, documenting, and fulfilling vendor financing opportunities.
Figure 18:
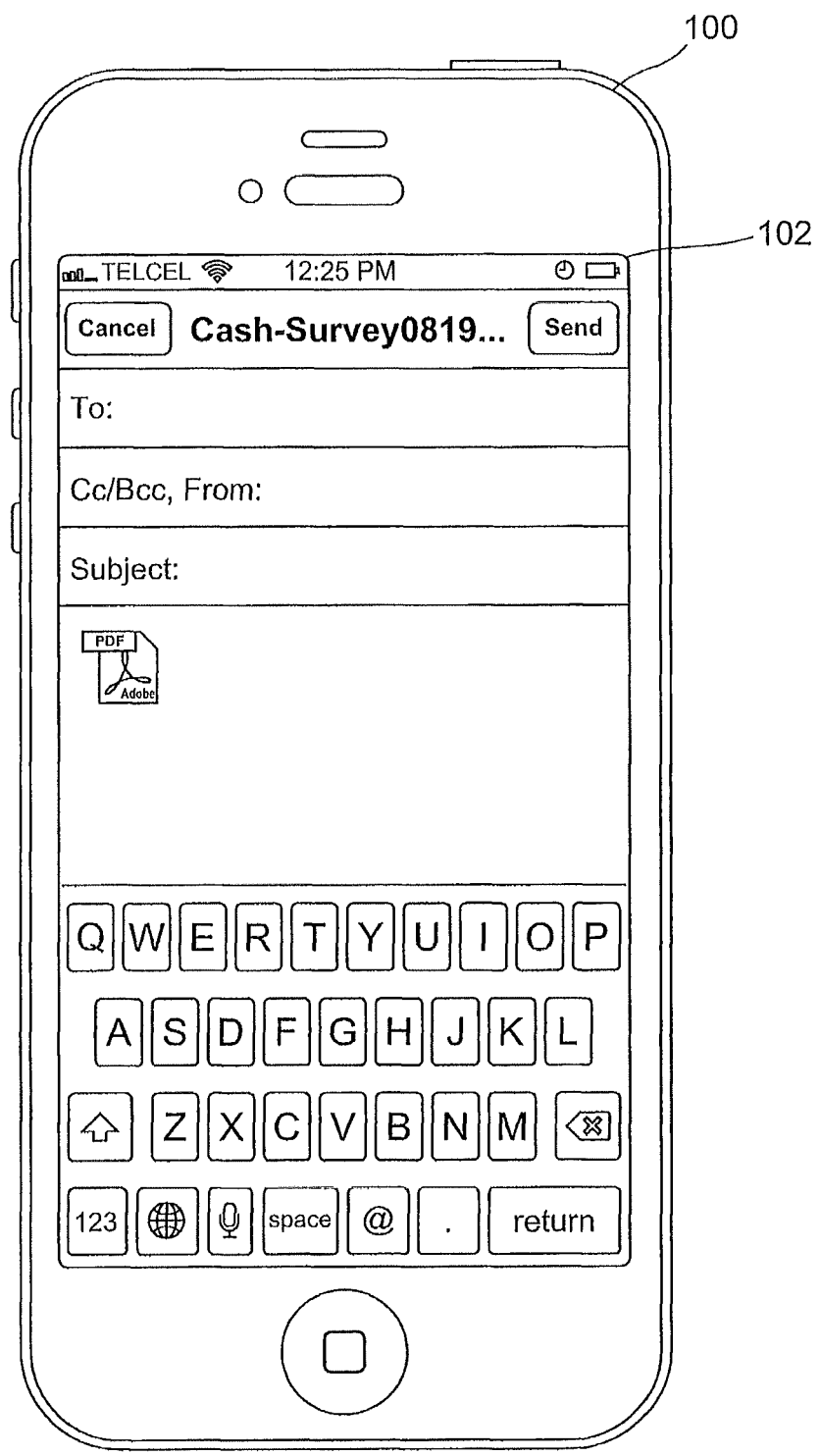
FIG. 18 illustrates an exemplary embodiment of a display page of the application for negotiating, generating, documenting, and fulfilling vendor financing opportunities.

FIG. 17 illustrates an exemplary display page of the mobile application which shows the status of the creation of a PDF file. After the customer signature has been accepted and the social security number of the customer has been entered, a display screen as shown in FIG. 17 can be displayed. The PDF file that is created by the application can include a contract that has been created based upon the information that has been entered into the application and the selections made by the user. Thus, the mobile application allows for a contract to be created easily and quickly by the user. Once the PDF has been created, the PDF file can be emailed as shown in FIG. 18. FIGS. 17 and 18 show the contract as a PDF file, but it is also possible for the contract to be created as an attachment in another file type, or the contract could be inserted into the body of the email.

Sorting and Searching Features of the Application

Figure 19:
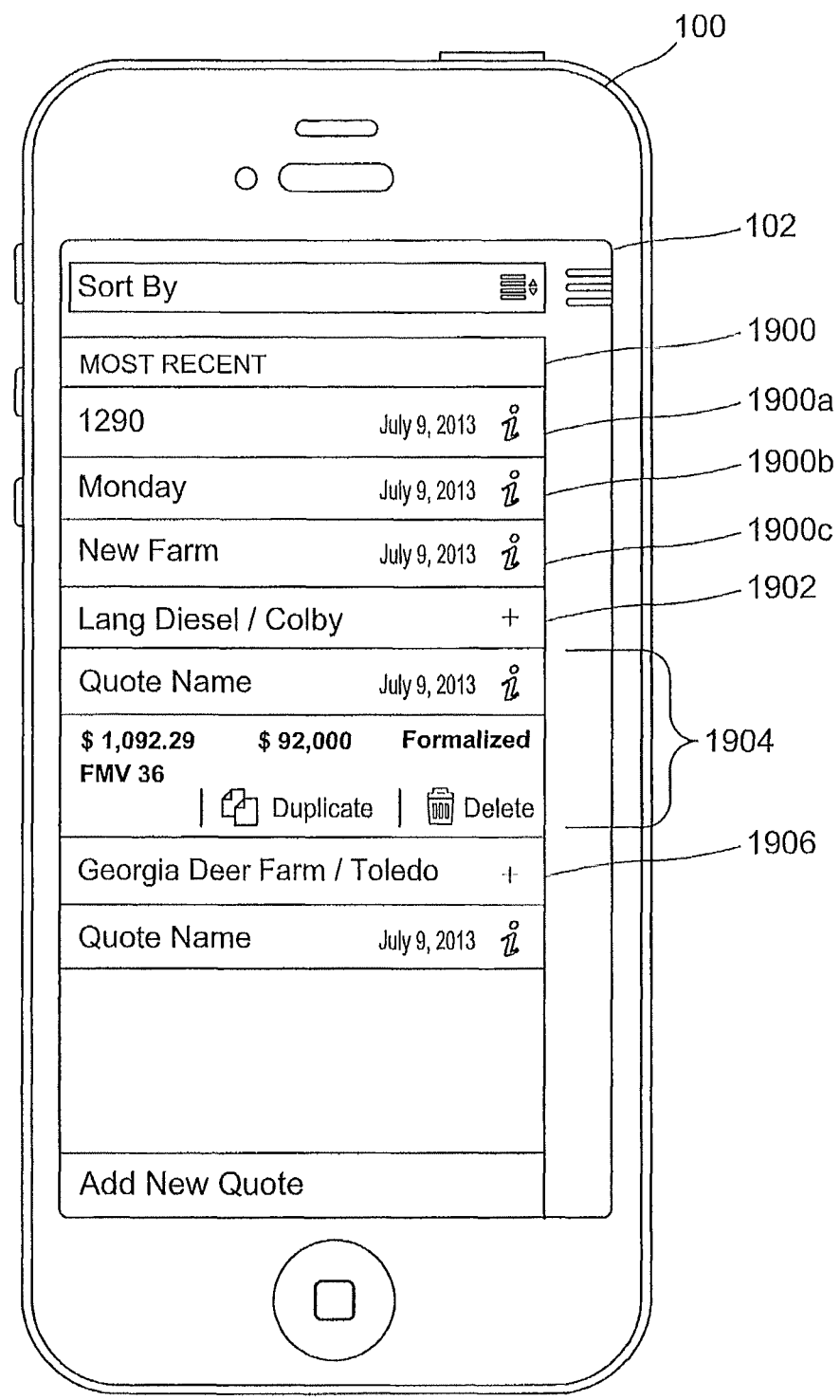
FIG. 19 illustrates an exemplary embodiment of a display page of the application for negotiating, generating, documenting, and fulfilling vendor financing opportunities.

FIG. 19 illustrates an exemplary display page of the mobile application that includes a most recent quote area 1900, which can include several recent quotes 1900a, 1900b, and 1900c. FIG. 19 also includes a customer name heading 1902, and an associated quote 1904 located below the customer name heading 1902. The quote 1904 indicates several items of information about the quote, such as the payment amount, the total dollar amount of the lease or purchase, the term of the financing or lease, and an indication that the quote is based upon a fair market value purchase option. FIG. 19 also includes a customer name heading 1906, and an associated quote that is listed below the customer name heading 1906.

Figure 20A:
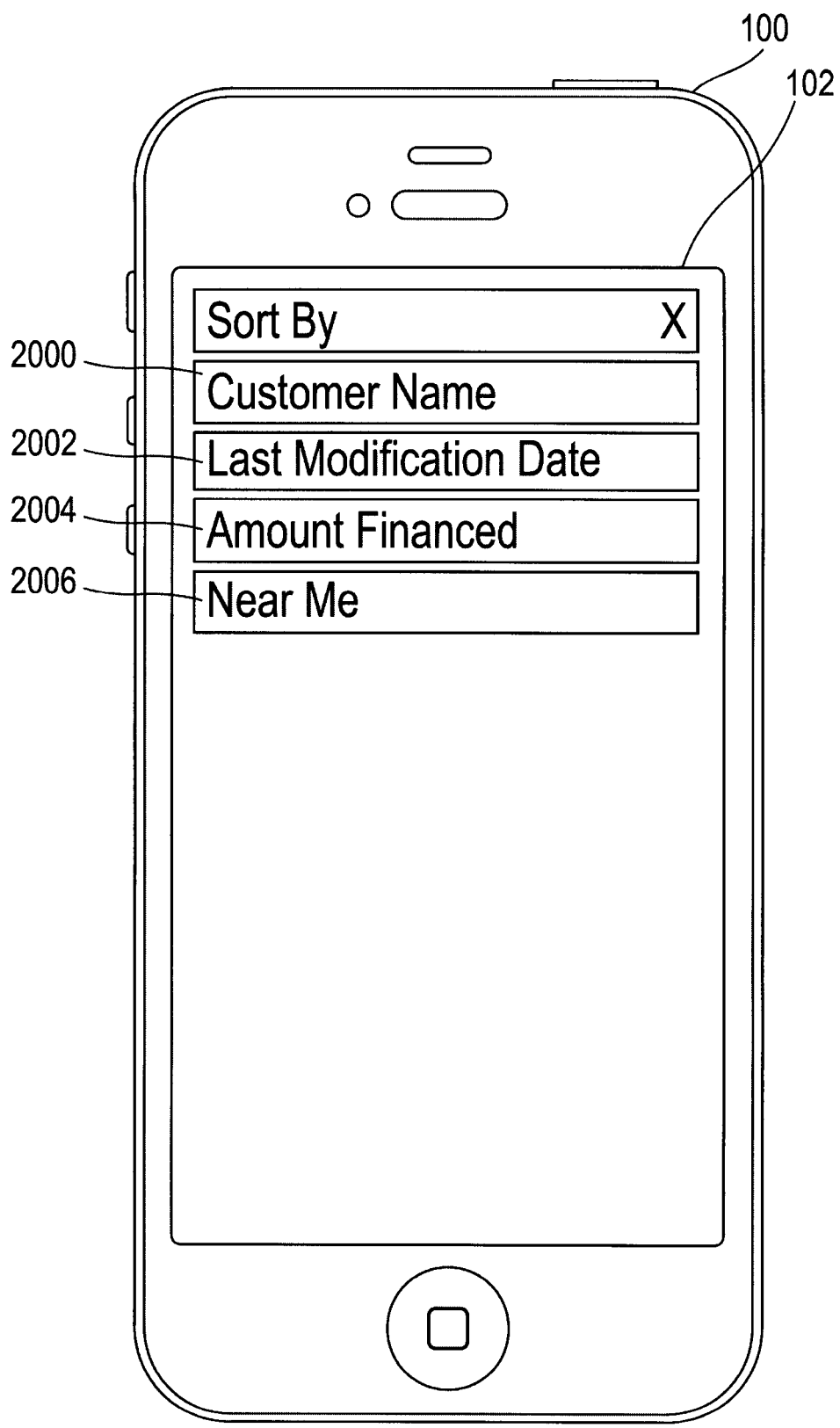
FIGS. 20A and 20B illustrate exemplary embodiments of display pages of the application for negotiating, generating, documenting, and fulfilling vendor financing opportunities.
Figure 20B:
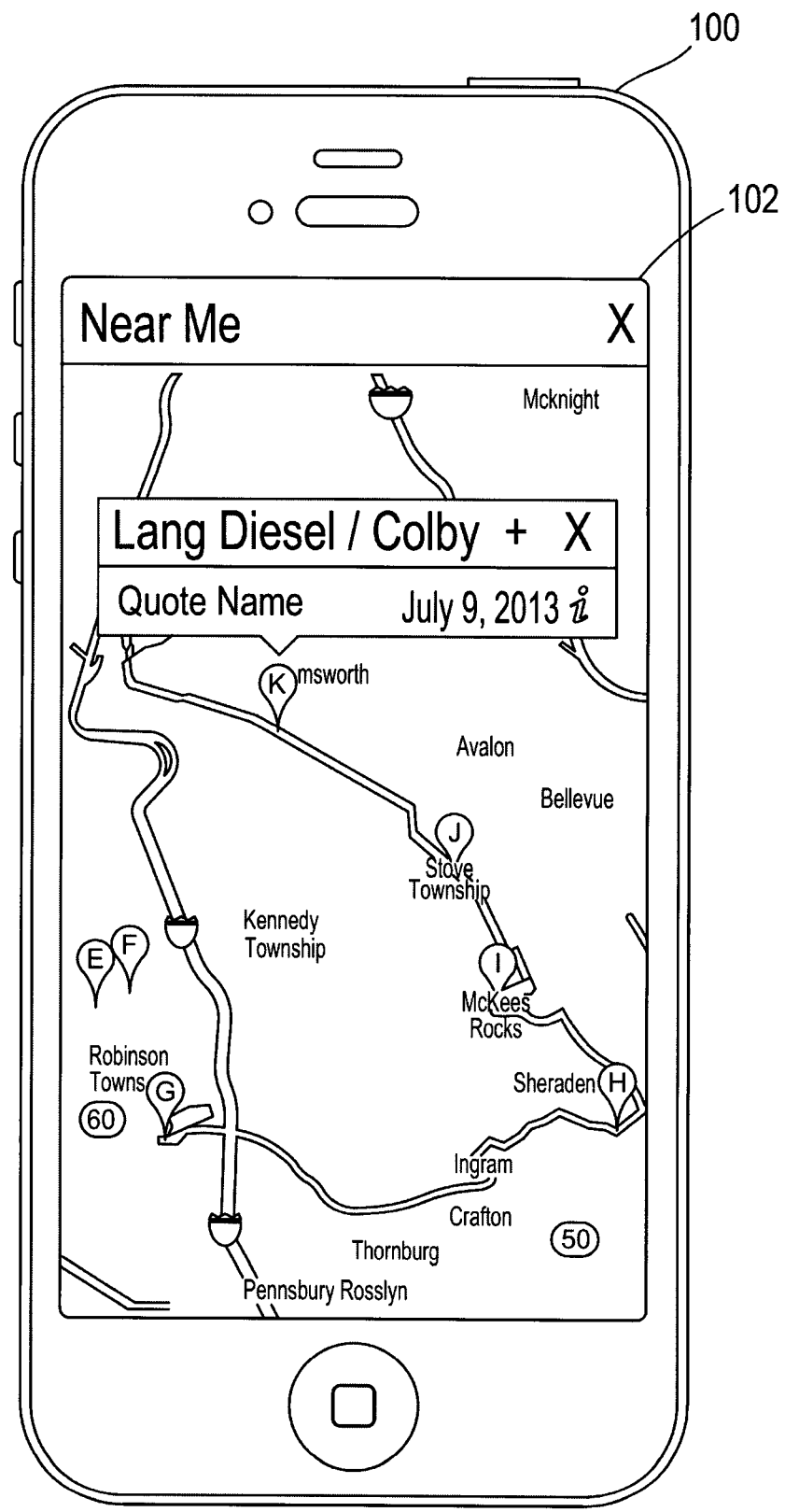
Figure 21:
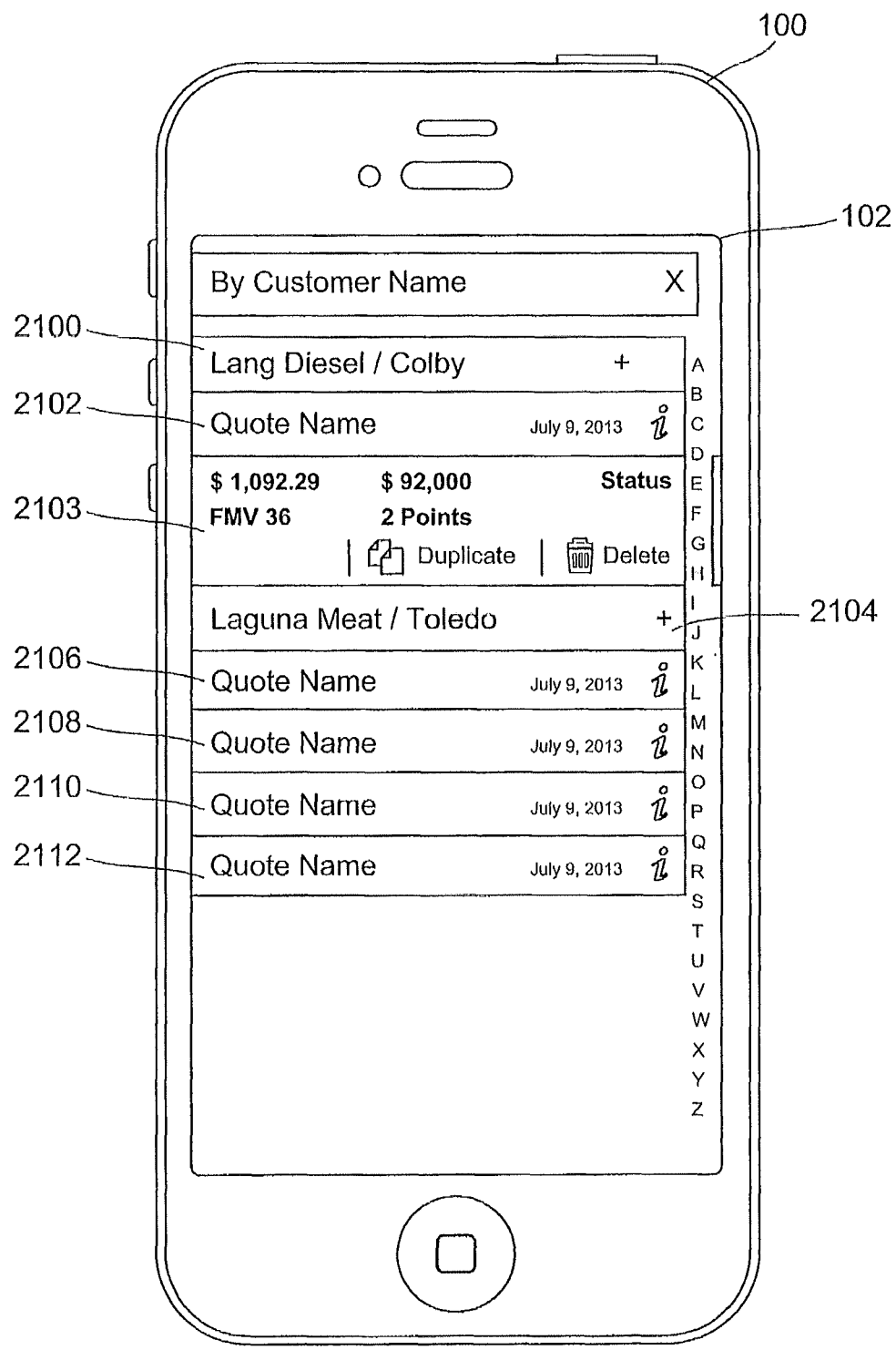
FIG. 21 illustrates an exemplary embodiment of a display page of the application for negotiating, generating, documenting, and fulfilling vendor financing opportunities.

FIGS. 20A and 20B illustrate exemplary display pages of the mobile application that can perform a search feature in which quotes can be sorted by various parameters. For example, in the display screen shown in FIG. 20A, the quotes can be sorted by customer name 2000, last modification date 2002, amount financed 2004, and by customer location 2006. When a search is performed based on a customer name, and a particular customer name is selected, the address, phone number, full customer name, etc. are auto-populated. When the customer location button 2006 is selected, a display screen as shown in FIG. 20B can be displayed. This display screen includes a map which shows several customers that are located close to the location of the computing device 100 that includes the application. The application is able to determine where the computing device is located based on GPS technology, for example. When the customer name button 2000 in FIG. 20A is selected, a screen as shown in FIG. 21 can be displayed. FIG. 21 shows a display screen in which several customer names are listed in alphabetical order. For example, FIG. 21 shows customer names starting with the letter "L." In FIG. 21, the customer name heading 2100 includes the name of the customer, "Lang Diesel," and the location of the customer, "Colby." The customer name heading 2100 could include additional information such as the state where the customer is located, etc. Underneath the customer name 2100, is a name of a quote 2102 that is associated with the customer Lang Diesel. Below the quote name 2102, is a quote display area 2103 which indicates details of the quote. For example, the payment amount, total amount of the product and/or service leased or financed, term of the financing or lease, number of commission points, and what the general structure of the proposed transaction, e.g., fmv, $1 out financing or fixed purchase option.

FIG. 21 also includes an additional customer name heading 2104 that indicates a name of a customer "Laguna Meat," along with the location of this customer, "Toledo." Below the customer name heading 2104 multiple names of quotes, 2106, 2108, 2110, and 2112 are displayed. FIG. 21 can also show the date a quote was made, and this date information can be listed next to the name of the quote 2106, 2108, 2110, and 2112. Thus, the mobile application allows a user to quickly store generated payment quotes and pricing information and to easily access all previous quotes that were created. The application can function as a quote library in which a quote can be retrieved, modified, and resent.

Figure 22:
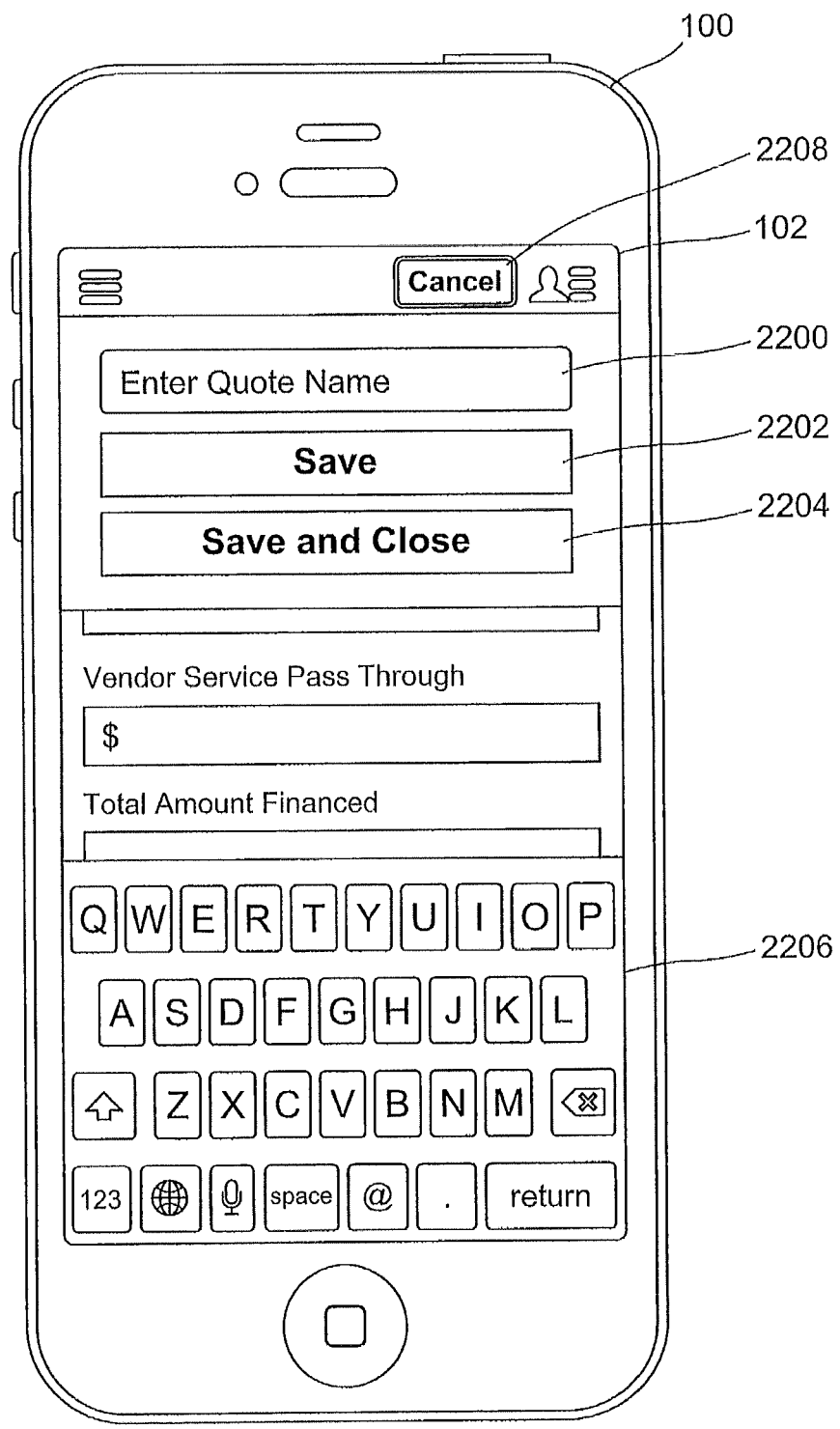
FIG. 22 illustrates an exemplary embodiment of a display page of the application for negotiating, generating, documenting, and fulfilling vendor financing opportunities.

FIG. 22 illustrates an exemplary display page of the mobile application that allows a user to assign a name to a quote in order to save the quote. FIG. 22 includes a quote name input field 2200 in which a user can type in a name for the quote by using an alpha-numeric keypad 2206. Once the quote name has been entered, the user can select a save button 2202. Also, FIG. 22 can include a save and close button 2204, which when selected, will save the entered quote name, and close the menu including the quote name search field 2200, the save button 2202, and the save and close button 2204. FIG. 22 also includes a cancel button 2208, which when selected, will close the menu including the quote name input field 2200, the save button 2202, and the save and close button 2204.

Figure 23:
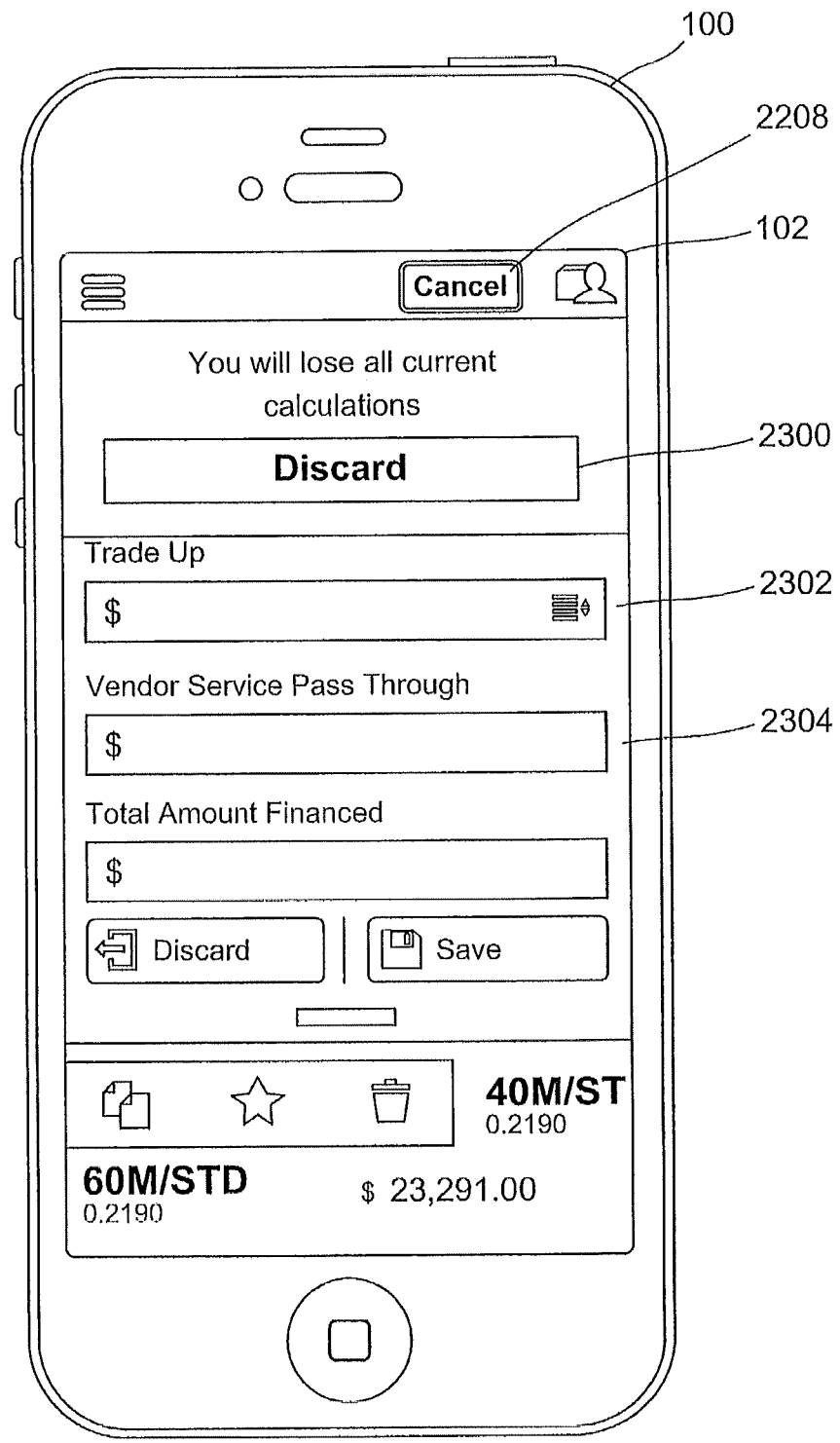
FIG. 23 illustrates an exemplary embodiment of a display page of the application for negotiating, generating, documenting, and fulfilling vendor financing opportunities.

FIG. 23 illustrates an exemplary display page of the mobile application that displays a warning message indicating that the user will lose all current calculations if they select the cancel button 2208 of FIG. 22. If the user selects a discard button 2300, all current calculations will be lost. If user selects (new button 2302), the current calculation can include the cost of trading up out of a previously financed transaction. If the user selects button 2304, then the user can select the amount of pass through service due the vendor for services delivered to the customer at an agreed upon frequency and amount that are collected by finance company and passed through to the vendor. These variables provided in buttons 2302 and 2304 impact the total amount financed and the payment amount, respectively.

Figure 26:
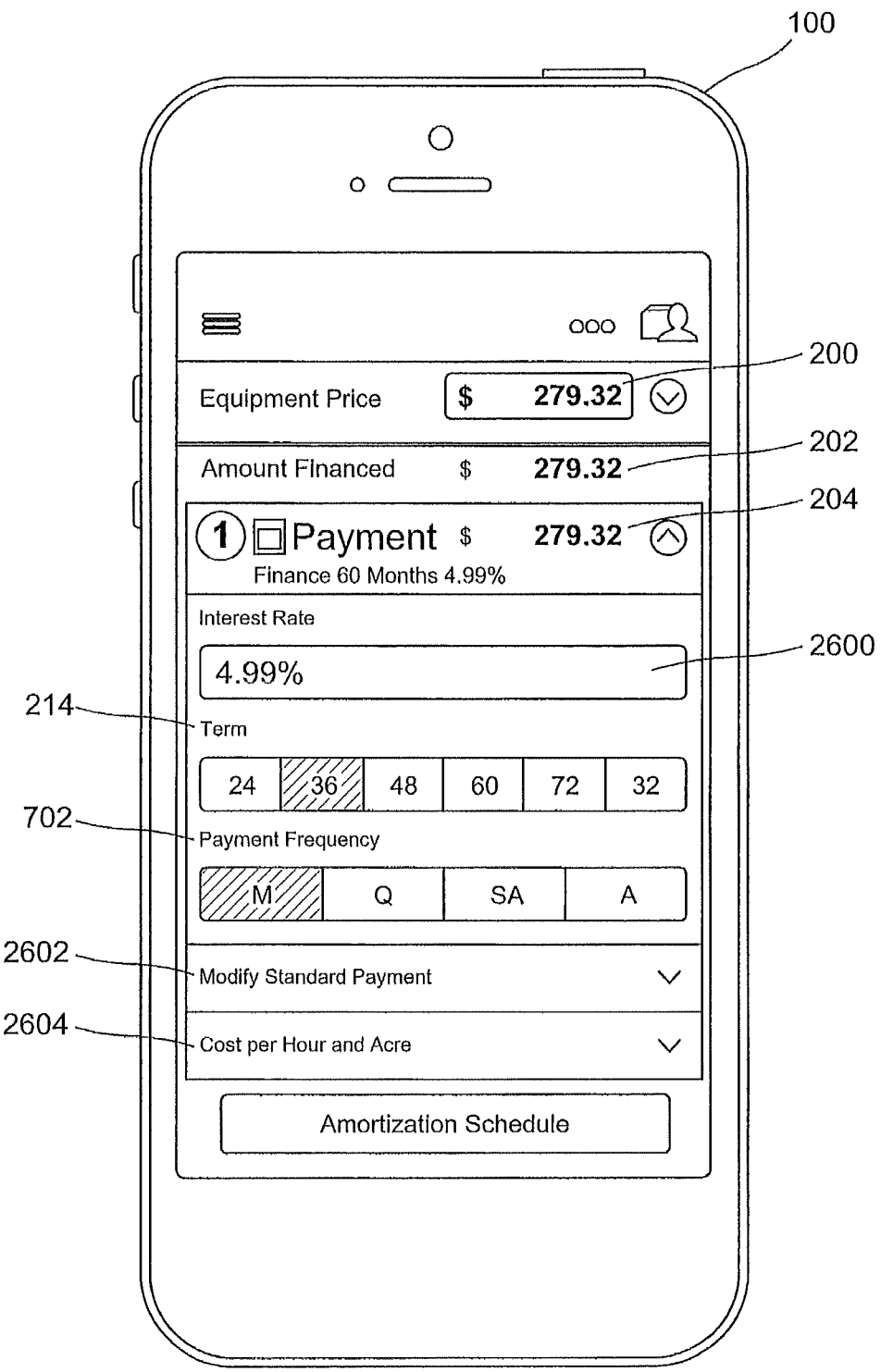
FIG. 26 illustrates an exemplary embodiment of a display page of the application for negotiating, generating, documenting, and fulfilling vendor financing opportunities.

FIG. 26 illustrates an exemplary display page of the mobile application in which a finance quote can be created and modified. FIG. 26 includes an interest rate field 2600 into which an interest rate can be inputted. The finance term can be selected at a payment term area 214. For example, FIG. 26 shows that finance term of 24, 36, 48, 60, 72, and 82 months can be selected. FIG. 26 could show different periods of time for the financing or lease of the product and/or services based upon implementation. The payment frequency can also be selected at payment frequency area 702. For example, a monthly, quarterly, semi-annual, or annual payment frequency can be selected at the payment frequency area 702. FIG. 26 can also include a modified standard payment menu 2602 which allows the user to modify the standard payment. Also, FIG. 26 can include a cost per hour and acre menu 2604 which allows the user to modify the cost per hour and acre, if necessary. The cost per hour and acre menu 2604 may be helpful for equipment that is used for farming or agricultural purposes. Also, FIG. 26 allows an amortization schedule to be displayed upon the selection of an amortization schedule button.

Figure 27:
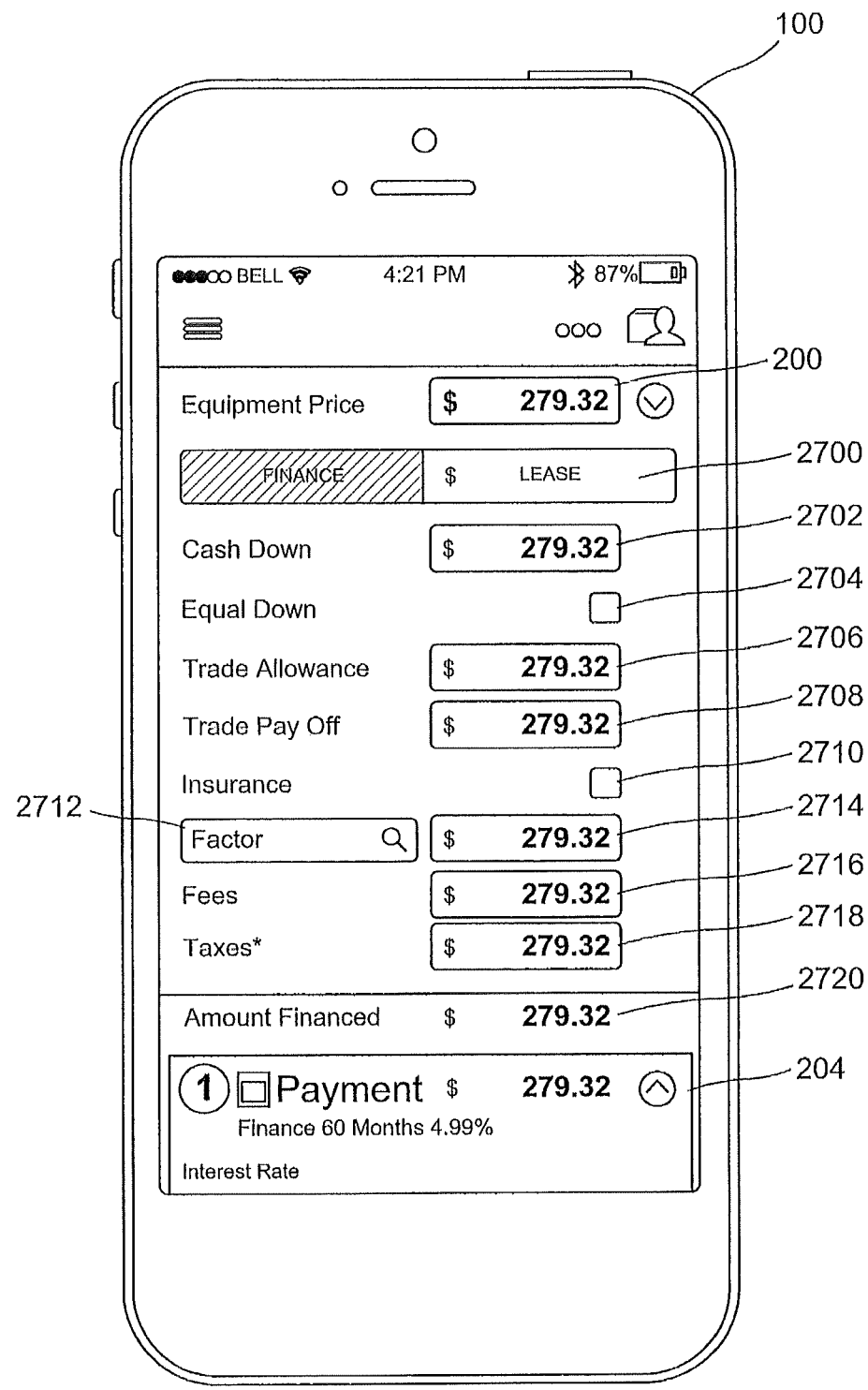
FIG. 27 illustrates an exemplary embodiment of a display page of the application for negotiating, generating, documenting, and fulfilling vendor financing opportunities.

FIG. 27 illustrates an exemplary display page of the mobile application that can be used for calculating a finance or lease quote for a piece of equipment. FIG. 27 can include the equipment price input field 200. In an exemplary embodiment, FIG. 27 includes a finance or lease selection area 2700, where a selection can be made as to whether the equipment will be financed or leased. FIG. 27 shows that the equipment will be financed based upon the selection shown in the finance or lease selection area 2700. FIG. 27 can include a cash-down input field 2702, in which a user can input the amount of money that will be put down as a down payment. FIG. 27 can also include an equal down selection box 2704. The equal down selection box 2704 gives the salesman the option of clicking this box to figure out what one cash down payment would equal. This keeps the salesman from entering the figures and guessing what an equal down should be. This feature is very beneficial when it comes to seasonal payment schedules. Thus, the equal down selection box 2704 will be selected if a customer would like to place an equal cash down payment in advance. FIG. 27 can also include a trade allowance input field 2706 in which a trade-in allowance amount is inputted. Also, FIG. 27 can include a trade payoff input field 2708 in which a trade payoff may be inputted. FIG. 27 can also include an insurance selection box 2710. Further, FIG. 27 can include a rate factor lookup field 2712, and a rate factor field 2714. FIG. 27 may include a fees field 2716 which shows any associated fees that are related with the equipment. Taxes field 2718 shows the estimated taxes that are associated with various input selected by the user on this screen. FIG. 27 can include an amount financed field 2720 which shows the total amount being financed. FIG. 27 may also include a payment quote at the payment field 204 which shows a quote for financing the equipment for 60 months with an interest rate of 4.99%.

Mobile Phone/Computer System Architecture

Figure 24:
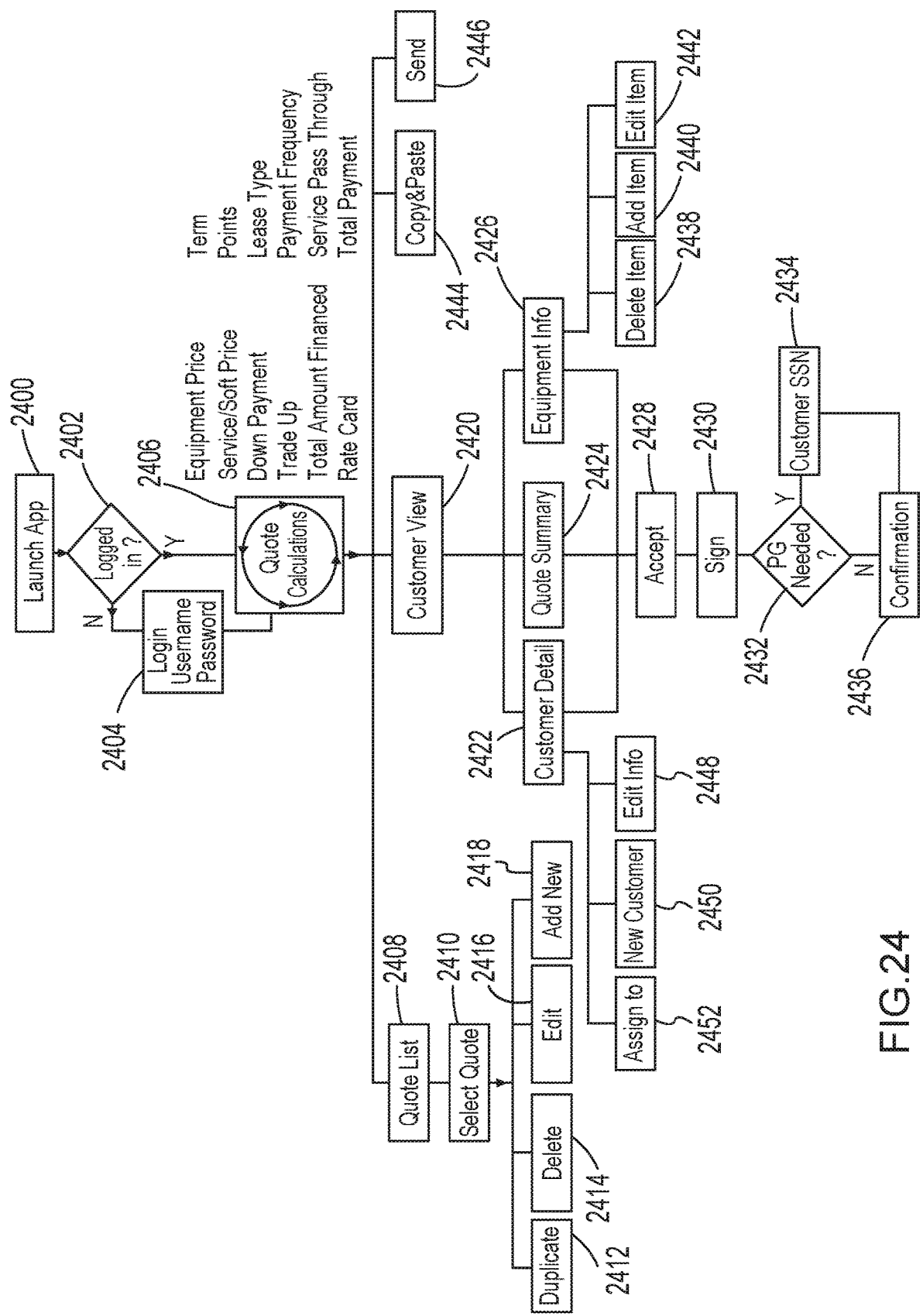
FIG. 24 is a flow chart illustrating an exemplary method of an embodiment.
Figure 25:
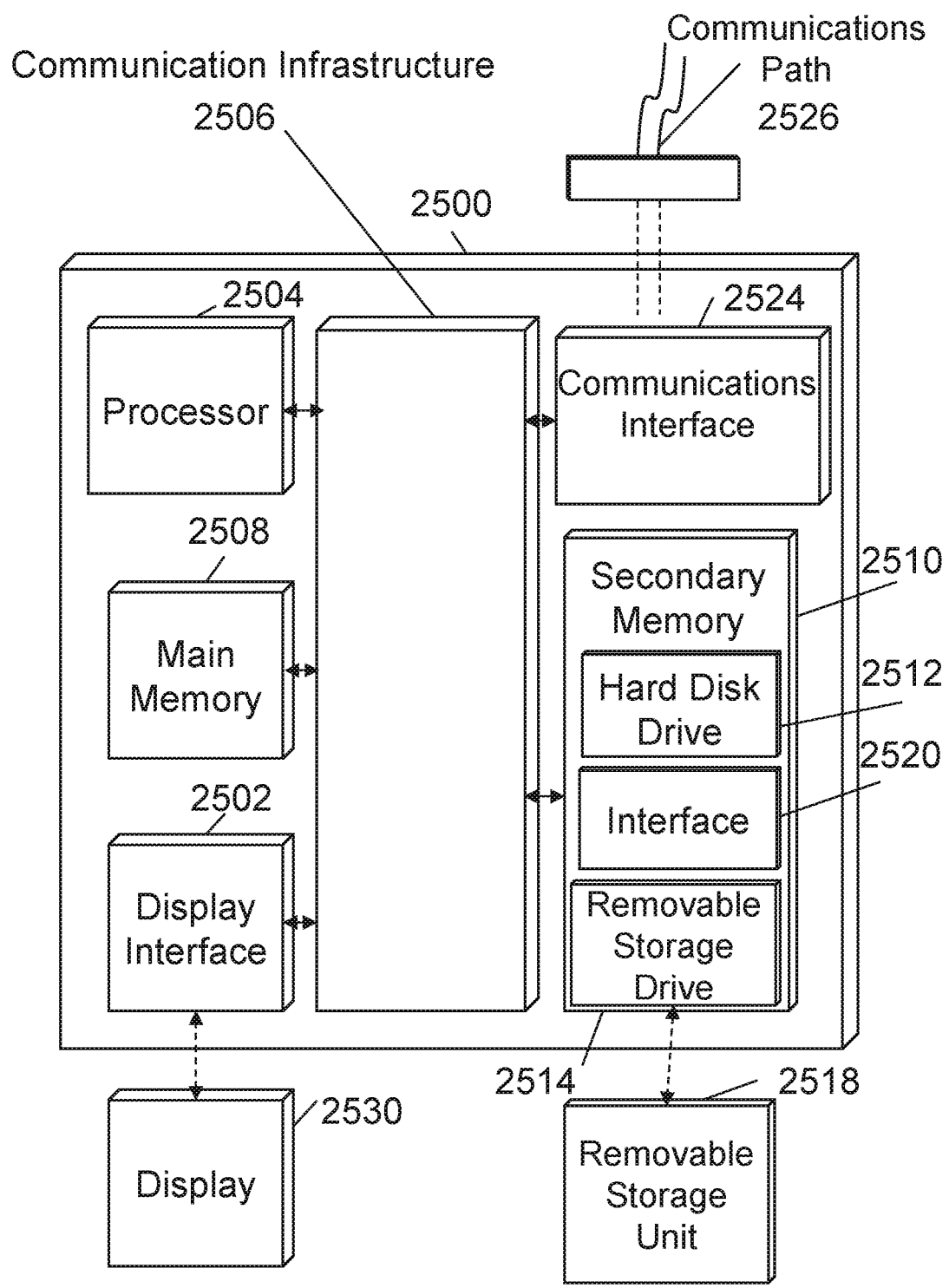
FIG. 25 is a block diagram illustrating a hardware architecture of a computer system in accordance with an exemplary embodiment.

FIG. 25 illustrates a computer system 2500 in which embodiments of the present disclosure, or portions thereof, may be implemented as computer-readable code compiled on a computer, thus making it a specific purpose computer. For example, the computing device 100 (e.g., smartphone, tablet, laptop, other mobile computing device, etc.) of FIG. 1 may be implemented in the computer system 2500 using hardware, software, firmware, non-transitory computer readable media having instructions stored thereon, or a combination thereof, and may be implemented in one or more computer systems or other processing systems. Hardware, software, or any combination thereof may embody modules and components used to implement the methods of FIGS. 24 and 28.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 2518, and a hard disk installed in hard disk drive 2512.

Various embodiments of the present disclosure are described in terms of this exemplary computer system 2500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 2504 may be a special purpose or a general purpose processor device. The processor device 2504 may be connected to a communication infrastructure 2506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 2500 may also include a main memory 2508 (e.g., random access memory, read-only memory, etc.), and may also include a secondary memory 2510. The secondary memory 2510 may include the hard disk drive 2512 and a removable storage drive 2514, such as a floppy disk drive, a magnetic tape drive, an optical disk drive, a flash memory, etc.

The removable storage drive 2514 may read from and/or write to the removable storage unit 2518 in a well-known manner. The removable storage unit 2518 may include a removable storage media that may be read by and written to by the removable storage drive 2514. For example, if the removable storage drive 2514 is a floppy disk drive, the removable storage unit 2518 may be a floppy disk. In one embodiment, the removable storage unit 2518 may be non-transitory computer readable recording media.

In some embodiments, the secondary memory 2510 may include alternative means for allowing computer programs or other instructions to be loaded into the computer system 2500, for example, the removable storage unit 2518 and an interface 2520. Examples of such means may include a program cartridge and cartridge interface (e.g., as found in video game systems), a removable memory chip (e.g., EEPROM, PROM, etc.) and associated socket, and other removable storage units 2618 and interfaces 2520 as will be apparent to persons having skill in the relevant art.

Data stored in the computer system 2500 (e.g., in the main memory 2508 and/or the secondary memory 2510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 2500 may also include a communications interface 2524. The communications interface 2524 may be configured to allow software and data to be transferred between the computer system 2500 and external devices. Exemplary communications interfaces 2524 may include a modem, a network interface (e.g., an Ethernet card), a communications port, a PCMCIA slot and card, etc. Software and data transferred via the communications interface 2524 may be in the form of signals, which may be electronic, electromagnetic, optical, or other signals as will be apparent to persons having skill in the relevant art. The signals may travel via a communications path 2526, which may be configured to carry the signals and may be implemented using wire, cable, fiber optics, a phone line, a cellular phone link, a radio frequency link, etc.

Computer program medium and computer usable medium may refer to memories, such as the main memory 2508 and secondary memory 2510, which may be memory semiconductors (e.g., DRAMs, etc.). These computer program products may be means for providing software to the computer system 2500. Computer programs (e.g., computer control logic) may be stored in the main memory 2508 and/or the secondary memory 2510. Computer programs may also be received via the communications interface 2524. Such computer programs, when executed, may enable computer system 2500 to implement the present methods as discussed herein. In particular, the computer programs, when executed, may enable processor device 2504 to implement the method illustrated by FIGS. 24 and 28 or similar methods, as discussed herein. Accordingly, such computer programs may represent controllers of the computer system 2500. Where the present disclosure is implemented using software, the software may be stored in a computer program product or computer readable medium and loaded into the computer system 2500 using the removable storage drive 2514, interface 2520, hard disk drive 2512, or communications interface 2524. Lastly, the computer system 2500 may also include a display interface 2502 that outputs display signals to a display unit 2530, e.g., LCD screen, plasma screen, LED screen, DLP screen, CRT screen, etc.

Exemplary Methods

FIG. 24 includes an exemplary flow chart that illustrates an exemplary flow of processes that can be performed by the application. At 2400, the mobile application for managing the financing or lease of a product is launched. For example, the screen of FIG. 1 is displayed. At 2402, it is determined whether or not the user is logged in. If the user is not logged in, at 2404, the user is prompted to log in using their username and password. For example, the screen shown in FIG. 1 can be used by the user to input their username and password. At 2402, if the user is already logged in, the process proceeds to 2406, where quotes are calculated. At 2406, quotes are calculated by inputting or selecting various parameters, such as: equipment price, service/soft price, down payment, trade up, total amount financed, rate card, term, points, lease type, payment frequency, service pass through, and total payment. Any combination of the above parameters could be used in the calculation of a quote. The information that is inputted to make the quote calculations at 2406 are inputted into the display screens shown in FIGS. 2-7, for example.

After the quotes are calculated, the method can proceed in one of four ways. For example, the quote list can be displayed at 2408, the customer view can be displayed at 2420, a copy and paste screen can be displayed at 2444, and a screen for sending quotes can be displayed at 2446. At 2408, the quote list is displayed. For example, the quote list may be the list of quotes shown in FIGS. 8A and 8B. At 2410, a quote can be selected. For example, the quote identified at the payment field 204 in FIGS. 8A and 8B. Once the quote is selected, the quote can be duplicated at 2412. The quote is duplicated by selecting the copy button 802 shown in FIG. 8B. At 2414, the quote can be deleted by selecting the delete button 804 shown in FIG. 8B. Quotes in the quote list can also be edited at 2416, or new quotes can be added to the quote list at 2418. For example, by using the add new payment calculator button 604 shown in FIG. 6.

After the quote calculations are created at 2406, the customer view mode of the application can be displayed on the computing device 100 at 2420. FIG. 13 illustrates an example of a display screen in the customer view mode. When the application is in the customer view mode at 2420, the process can proceed to 2422, where a customer detail screen is displayed. For example, FIG. 13 shows customer details that are displayed in the customer information display area 1302. At 2452, a customer (and associated customer information) can be assigned to a quote or associated with a quote. At 2450, a new customer can be added by entering the customer's contact information and saving the contact information for future use. For example, new customer information could be entered into the fields shown on the display screen FIG. 9A or display screen shown in FIG. 10 or 13. At 2448, customer information can be edited. For example, by modifying the customer information displayed in the fields shown on the display screen of FIG. 9A or the display screen shown in FIG. 10 or 13.

After the customer view is displayed at 2420, the process can also proceed to 2426, where equipment information is displayed. For example, FIGS. 11 and 14 show display screens in which equipment information are displayed. At 2438, a piece of equipment can be deleted. At 2440, a piece of equipment can be added, and at 2442, at piece of equipment can be edited. For example, in the display screen of FIG. 14, equipment shown in the equipment list area 1400 can be deleted, added, or edited.

After the customer view is displayed at 2420, the process can also proceed to 2424, where a quote summary is displayed by the application. For example, FIG. 13 shows a quote summary for the quote displayed at the third payment field 800. After a summary of the quote is displayed at 2424, the customer can accept the quote at 2428. At 2430, the customer signs the display screen shown in FIG. 15 as part of the process to accept quote. At 2432, it is determined by the processor 2504, whether or not the customer's social security number is needed to proceed with the transaction. If the social security number is needed, at 2434, the customer enters in their social security number. For example, FIG. 16 illustrates a screen in which the user can enter in their social security number by using the numeric keypad 1600. At 2436, a confirmation page is displayed confirming that the contract has been accepted by the customer.

Another exemplary method will now be explained. The exemplary method is for managing a financing or lease of a product, and the method is executed on the computing device 100. The computing device 100 can include the processor 2504, the display unit 2530, the transmitting unit 2524, the user input device 102 (e.g., a touchscreen) that is configured to accept inputs from a user, and the storage device 2508 storing executable instructions which when executed by the processor 2504 of the computing device 100 perform the method. The method includes receiving, from an input by the user input device 102, a price of the product to be financed or leased. For example, the price of the product can be entered in to the equipment price input field 200 shown in FIG. 2 by the user input device 102.

Next, the method can include receiving, from an input by the user input device 102, an amount of the price of the product to be financed. For example, an amount to be financed can be entered into the amount financed input field 202 shown in FIG. 2 by the user input device 102. The amount financed could be the total amount of the equipment or any amount less than the total amount of the equipment.

Next, the method can include selecting, by an input of the user input device 102, a rate card. For example, when the rate card selection button 208 is selected, a rate card can be selected from the rate program selection drop down menu 210. Based on the selected rate card, the processor 2504 determines a current finance rate factor based upon the rate card that is selected. The current finance rate factor can be a stored rate, and will be applied in the financing or leasing payment calculations. The rate program selection drop down menu 210 is convenient as it avoids the need to look up the relevant rate factor and manually input the rate. Further, up-to-date rate card information can be obtained in real-time, and a large number of rates can be easily stored and accessed by the application.

The method can also include a step of selecting, by an input of the user input device 102, a purchase option for the product and/or service. For example, a user of the computing device 100 can select one of the three purchase options shown in FIG. 3. Any number of purchase options can be displayed in FIG. 3. Exemplary purchase options shown in FIG. 3 are a fair market value purchase option 212a, a one dollar purchase option 212b, and a fixed payment option 212c.

Next, the method can include selecting, by an input of the user input device 102, a total term of the financing or lease related to purchase or lease the product and/or service. For example, in the display screen of FIG. 4, a term of 24 months 214a, 36 months 214b, 48 months 214c, or 60 months 214d can be selected. The term of the financing or lease is not limited to 24, 36, 48, or 60, but rather could be any other term. FIG. 4 can also display more than four term options.

Next, the method can include a step of determining, by the processor 2504, a payment amount (e.g. a monthly payment amount, quarterly payment amount, etc.) for the product based on the inputted price of the product to be financed or leased (e.g., the amount entered in equipment price input field 200), the amount of the price of the product to be financed (e.g., the amount entered in the amount financed input field 202), the current finance rate (e.g. determined by a selected rate card in the rate program selection drop down menu 210 or an inputted finance rate), the purchase option selected (e.g., selecting one of the fair market value purchase option 212*a*, the one dollar purchase option 212*b*, or the fixed payment option 212*c*), and the total term of the financing or lease selected (e.g., 24, 36, 48, or 60 months).

After the payment amount is determined by the processor 2504, the payment amount is displayed on the display unit 2530 of the computing device 100. For example, the calculated payment amount is displayed at the payment field 204 shown in FIG. 4.

In an exemplary embodiment, the user input device 102 can select a customer from a contacts list (e.g. the contacts list of FIG. 9A), and contact information of the customer can be auto-populated into customer contact fields. In other words, the computing device 100 receives a selection of a customer from a contacts list, and the computing device 100 auto-populates contact information of the customer into customer contact fields. In an exemplary embodiment, the computing device 100 saves the populated customer contact fields. The contact information of the customer can then be associated with the product to be leased or financed and the calculated payment amount of the product.

In an exemplary embodiment, the method can include a step of selecting, by an input of the user input device 102, the product to be leased or financed from a drop-down list. Based on the selected product, make and model information about the product can be auto-populated into product make and product model information fields 1104, 1106, 1008, 1110, etc. In an exemplary embodiment, the populated product make and product model information fields 1104, 1106, 1008, 1110, etc. can be saved by the computing device 100. The computing device 100 can then associate the product make and product model information fields 1104, 1106, 1008, 1110, etc. with the contact information of the customer.

In an exemplary embodiment, the method may include a step of generating, by the processor 2504, a quote for the customer, wherein the quote includes the payment amount for the product, the finance charge rate, the purchase option that was used to calculate the payment amount, the total term of the financing or lease that was used to calculate the payment amount, the make and model information of the product, and the contact information of the customer. FIGS. 8A and 8B show a list of exemplary quotes.

In an exemplary embodiment, the method may include a step of sending, by the transmitting unit 2524 of the computing device, the quote via email to the customer. For example, FIG. 18 shows a display screen in which a quote may be emailed to another email address (e.g., to a customer, a supervisor, etc.).

In an exemplary embodiment, the quote can be accepted by the customer by receiving a signature of the customer inputted by the user input device 102. For example, FIG. 15 shows a signature page that is configured to accept a signature as an input. A social security number may also need to be inputted by the user input device 102 in order for the quote to be accepted. For example, after the signature is inputted, a user can select the enter social security number button 1506, and the user can be prompted to enter in their social security number via the numeric keypad 1600 displayed in FIG. 16.

In an exemplary embodiment, all or some of the above methods for managing a financing or lease of a product is executed by a mobile application stored on a mobile computing device 100. The mobile computing device 100 includes, for example, the processor 2504, the display unit 2530, the transmitting unit 2524, the user input device 102 that is configured to accept inputs from the user, and the storage device 2508 stores the mobile application which contains executable instructions which when executed by the processor 2504 of the mobile computing device 100 performs the method or methods of the application.

In an exemplary embodiment, a non-transitory computer readable storage medium stores computer program instructions that are executed to cause a processor to implement all or some of the above described methods for managing a financing or lease of a product.

Figure 28:
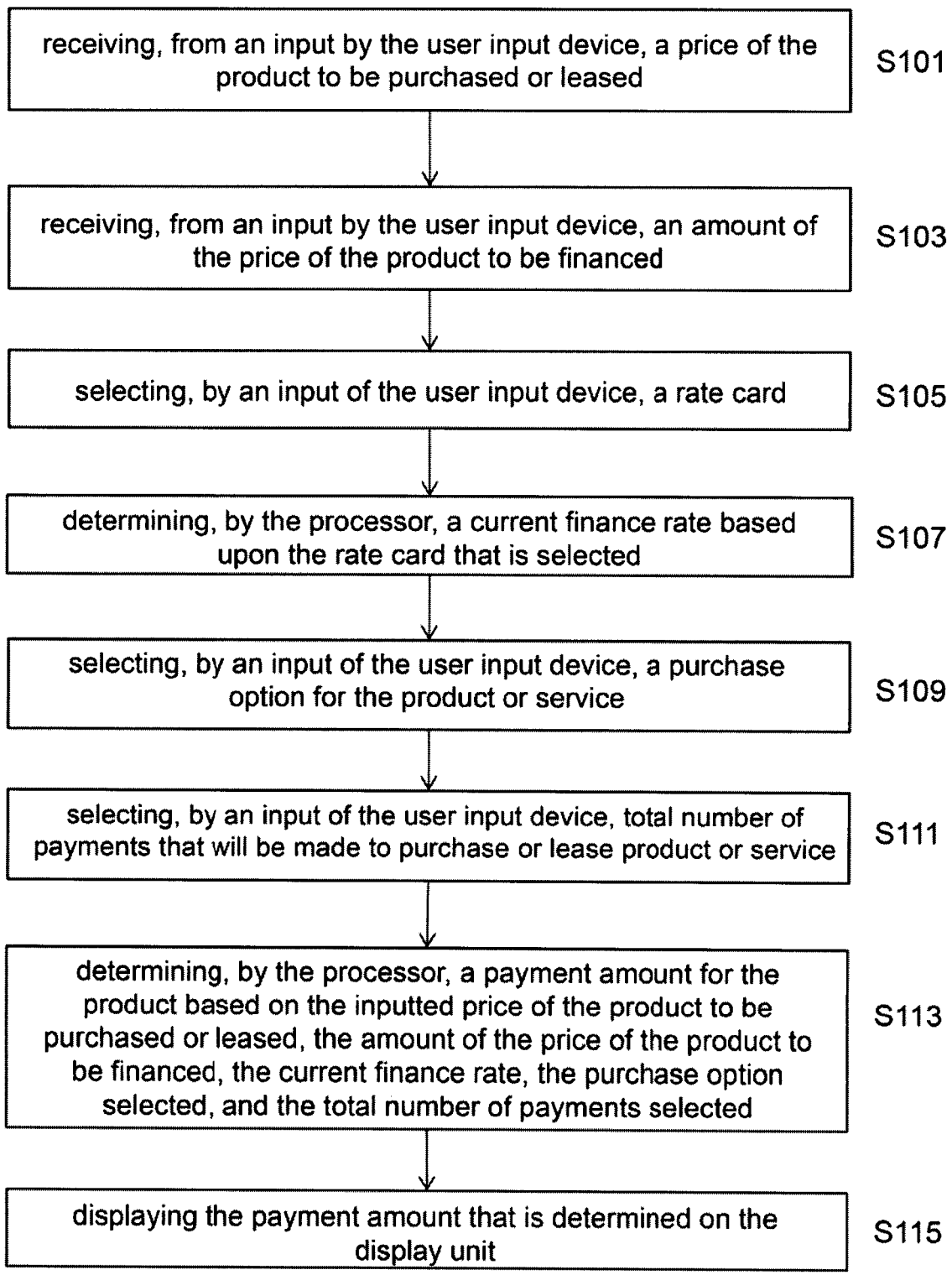
FIG. 28 is a flow chart illustrating an exemplary method of an embodiment.

FIG. 28 illustrates an exemplary method for managing a financing or lease of a product. Step S101 includes receiving, from an input made by the user input device 102, a price of the product to be financed or leased. Step S103 includes receiving, from an input by the user input device 102, an amount of the price of the product to be financed. Step S105 includes a step of selecting, by an input of the user input device 102, a rate card.

Step S107 includes determining, by the processor 2504, a current finance rate based upon the rate card that is selected. Step S109 includes selecting, by an input of the user input device 102, a purchase option for the product and/or service. Step S111 includes selecting, by an input of the user input device 102, a total term of the financing or lease that will be made to purchase or lease the product and/or service. Next, Step S113 includes determining, by the processor 2504, a payment amount for the product based on the inputted price of the product to be financed or leased, the amount of the price of the product to be financed, the current finance rate, the purchase option selected, and the total term of the financing or lease selected. Lastly, Step S115 includes displaying the payment amount that is determined on the display unit 2530 of the computing device 100.

FIG. 29 is a diagram illustrating a system in accordance with an exemplary embodiment. FIG. 29 shows the computing device 100, an office 2900, a manufacturer 2902, and a shipping company 2904 all connected to each other through a network 2906 (e.g., a computer network such as the internet). The office 2900 can be, for example, a vendor's office where the user of the computing device 100 works. In an exemplary embodiment, the office 2900 can include an inventory database 2908, a contract database 2910, a pricing database 2912, a customer database 2912, and a services database 2920.

The customer database 2914 can store customer information electronically. The customer information can include, for example, customer names, customer phone numbers, specific points of contact, customer addresses, customer leasing/purchasing histories, customer financial information, etc. The application executing on the computing device 100 can access the customer information stored in the customer database 2914 remotely via the network 2906.

The inventory database 2908 can store inventory information electronically. The inventory information can include, for example, product availability, specific quantities of products that are available, when products will be in stock, when new products are coming out, where various products are located, etc. The application executing on the computing device 100 can access the inventory information stored in the inventory database 2908 remotely via the network 2906.

The contract database 2910 can store various contracts electronically. The contracts that are stored are contracts that can be used for the lease or financing of products and/or services. The application executing on the computing device 100 can access the contracts stored in the contract database 2910 remotely via the network 2906.

The pricing database 2912 can store product pricing information electronically. The product pricing information can include, for example, retail prices for products, wholesale prices for products, profit margins for products, suggested prices for products, leasing prices/terms for products, down payment information for products, etc. The application executing on the computing device 100 can access the pricing information stored in the pricing database 2912 remotely via the network 2906.

The services database 2920 can electronically store information about services that can be purchased. The service information can include information about any additional services that can be sold with a product that is financed or leased. For example, the service information could be insurance rates/terms associated with insuring products, extended warranty rates/terms for insuring products, maintenance program information and prices that can be used with products, etc. The service information can also be information about stand-alone services (services that do not have to be obtained in conjunction with the leasing or financing of a product). The application executing on the computing device 100 can access the service information stored in the service database 2920 remotely via the network 2906.

In FIG. 29, the manufacturer 2902 can be the manufacturer of a product that the user is trying to lease or sell. For example, if the user is trying to sell a copier to a business, the manufacturer 2902 could be the company that manufactures the copier. In an exemplary embodiment, the manufacturer 2902 includes a products database 2916 which stores product information about the various products the manufacturer makes. The product information can include, for example, technical specifications of the various products, product make and model information, product capabilities, serial numbers, product compatibility information, product manuals, product warranty information, etc. The application executing on the computing device 100 can access the product information stored in the product database 2916 remotely via the network 2906.

The shipping company 2904 can be a shipper (e.g., FedEx®, UPS®, DHL®, etc.) of a product or products that the user is trying to lease or sell, or has leased or sold. In an exemplary embodiment, the shipping company 2904 includes a shipping database 2918 which stores shipping information pertaining to the various products the manufacturer makes. The shipping information can include, for example, shipping costs of the various products, packaging costs of extra packaging required to ship a product, shipping time frames (e.g., how long it will take to ship a product from one location to another), availability of different methods of shipping (e.g., ground, air, next-day, etc.), etc. The application executing on the computing device 100 can access the shipping information stored in the shipping database 2918 remotely via the network 2906.

While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope. For example, the method and system for negotiating, generating, documenting, and fulfilling vendor financing opportunities described in some or all of the embodiments above may be implemented in an application stored on a mobile device; however in another exemplary embodiment the method and system for negotiating, generating, documenting, and fulfilling vendor financing opportunities described in the embodiments above may be implemented in a website (either a full version or a mobile version) located on a server or computer that is accessed by a browser, program, or application on a mobile device (e.g., smartphone, tablet, etc.) or any other computing device (e.g., laptop computer, desktop computer, etc.).

As can be seen above, the method and system for negotiating, generating, documenting, and fulfilling vendor financing opportunities can be implemented in any number of ways as discussed above, or as will become apparent to those skilled in the art after reading this disclosure. These embodiments, as well as variations and modifications thereof that will occur to those skilled in the art, are encompassed by the method and system for negotiating, generating, documenting, and fulfilling vendor financing opportunities. Hence, the scope of the method and system for negotiating, generating, documenting, and fulfilling vendor financing opportunities is limited only by the meets and bounds as articulated in the claims appended hereto.

What is claimed is:

1. A method for managing a financing or lease of a product, the method executing on a computing device including a processor, a display unit, a transmitting unit, a user input device that is configured to accept inputs from a user, and a storage device storing executable instructions which when executed by the processor of the computing device perform the method, the method comprising:

receiving, from an input by the user input device, a price of the product to be financed or leased;

receiving, from an input by the user input device, an amount of the price of the product to be financed;

selecting, by an input of the user input device, a rate card from a plurality of rate cards;

determining, by the processor, a current finance rate based upon the rate card that is selected;

selecting, by an input of the user input device, a purchase option for the product and/or service;

selecting, by an input of the user input device, a total term of the financing or lease that will be made to purchase or lease the product and/or service;

determining, by the processor, a payment amount for the product based on the inputted price of the product to be financed or leased, the amount of the price of the product to be financed, the current finance rate, the purchase option selected, and the total term of the financing or lease selected;

displaying the payment amount, in a payment field, and an associated first graphical wheel dial for adjusting the payment amount, wherein the payment amount and the associated first graphical wheel dial are displayed in a first display region of a graphical user interface shown on the display unit;

displaying a value other than the payment amount and an associated second graphical wheel dial for adjusting the value other than the payment amount in a second display region of the graphical user interface;

adjusting the first or second graphical wheel dial, by an input from the user device, and dynamically displaying changes to the payment amount and/or the value other than the payment amount as a result of the adjusting; and in response to an instruction received, by the input device, to drag the payment field, dragging the payment field in a direction associated with the received instruction across the first display region of the graphical user interface, wherein said dragging of said payment field causes the display of three selectable icons in the first display region.

2. The method of claim 1, wherein the purchase option is selected from among a plurality of purchase options including a fair market value purchase option and a one dollar purchase option.

3. The method of claim 1, further comprising:
selecting, by an input of the user input device, a customer from a contacts list, and auto-populating contact information of the customer into customer contact fields;
saving the populated customer contact fields; and
associating the contact information of the customer with the product and the payment amount.

4. The method of claim 3, further comprising:
selecting, by an input of the user input device, the product to be leased or financed from a drop-down list;
auto-populating make and model information about the product into product make and product model information fields;
saving the populated product make and product model information fields; and
associating the product make and product model information fields with the contact information of the customer.

5. The method of claim 4, further comprising:
generating, by the processor, a quote for the customer, wherein the quote includes the payment amount for the product, the finance charge rate, the purchase option that was used to calculate the payment amount, the total term of the financing or lease that was used to calculate the payment amount, the make and model information of the product, and the contact information of the customer.

6. The method of claim 5, further comprising:
sending, by the transmitting unit of the computing device, the quote via email to the customer.

7. The method of claim 5, further comprising:
accepting the quote by receiving a signature of the customer inputted by the user input device and a social security number inputted by the user input device.

8. A non-transitory computer readable storage medium storing computer program instructions which when executed cause a processor to implement a method for managing a financing or lease of a product, the method comprising:
receiving, from an input by a user input device, a price of the product to be financed or leased;
receiving, from an input by the user input device, an amount of the price of the product to be financed;
selecting, by an input of the user input device, a rate card from a plurality of rate cards;
determining a current finance rate based upon the rate card that is selected;
selecting, by an input of the user input device, a purchase option for the product and/or service;
selecting, by an input of the user input device, a total term of the financing or lease that will be used to purchase or lease the product and/or service;
determining a payment amount for the product based on the inputted price of the product to be financed or leased, the amount of the price of the product to be financed, the current finance rate, the purchase option selected, and the total term of the financing or lease selected;
displaying the payment amount, in a payment field, and an associated first graphical wheel dial for adjusting the payment amount, wherein the payment amount and the associated first graphical wheel dial are displayed in a first display region of a graphical user interface shown on a display unit;
displaying a value other than the payment amount and an associated second graphical wheel dial for adjusting the value other than the payment amount in a second display region of the graphical user interface;
adjusting the first or second graphical wheel dial, by an input from the user device, and dynamically displaying changes to the payment amount and/or the value other than the payment amount as a result of the adjusting, and
in response to a received instruction to drag the payment field, dragging the payment field in a direction associated with the received instruction across the first display region of the graphical user interface, wherein said dragging of said payment field causes the display of three selectable icons in the first display region.

9. The non-transitory computer readable storage medium of claim 8, wherein the purchase option is selected from among a plurality of purchase options including a fair market value purchase option and a one dollar purchase option.

10. The non-transitory computer readable storage medium of claim 8, further comprising:
receiving a selection of a customer from a contacts list, and auto-populating contact information of the customer into customer contact fields;
saving the populated customer contact fields; and
associating the contact information of the customer with the product and the payment amount.

11. The non-transitory computer readable storage medium of claim 10, further comprising:
receiving a selection of the product to be leased or financed from a drop-down list;
auto-populating make and model information about the product into product make and product model information fields;
saving the populated product make and product model information fields; and
associating the product make and product model information fields with the contact information of the customer.

12. The non-transitory computer readable storage medium of claim 11, further comprising:
generating a quote for the customer, wherein the quote includes the payment amount for the product, the finance charge rate, the purchase option that was used to calculate the payment amount, the total term of the financing or lease that were used to calculate the payment amount, the make and model information of the product, and the contact information of the customer.

13. The non-transitory computer readable storage medium of claim 12, further comprising:
sending the quote via email to the customer.

14. The non-transitory computer readable storage medium of claim 12, further comprising:
accepting the quote by receiving an electronic signature of the customer and a social security number of the customer.

15. A method for managing a financing or lease of a product, the method executed by a mobile application on a mobile computing device including a processor, a display unit, a transmitting unit, a user input device that is configured to accept inputs from a user, and a storage device storing the mobile application which contains executable instructions which when executed by the processor of the mobile computing device perform the method, the method comprising:

receiving, from an input by the user input device, a price of the product to be financed or leased;

receiving, from an input by the user input device, an amount of the price of the product to be financed;

selecting, by an input of the user input device, a rate card from a plurality of rate cards;

determining, by the processor, a current finance rate based upon the rate card that is selected;

selecting, by an input of the user input device, a purchase option for the product and/or service;

selecting, by an input of the user input device, a total term of the financing or lease that will be made to purchase or lease the product and/or service;

determining, by the processor, a payment amount for the product based on the inputted price of the product to be financed or leased, the amount of the price of the product to be financed, the current finance rate, the purchase option selected, and the total term of the financing or lease selected;

displaying the payment amount, in a payment field, and an associated first graphical wheel dial for adjusting the payment amount, wherein the payment amount and the associated first graphical wheel dial are displayed in a first display region of a graphical user interface shown on a display unit;

displaying a value other than the payment amount and an associated second graphical wheel dial for adjusting the value other than the payment amount in a second display region of the graphical user interface;

adjusting the first or second graphical wheel dial, by an input from the user device, and dynamically displaying changes to the payment amount and/or the value other than the payment amount as a result of the adjusting; and in response to an instruction received, by the input device, to drag the payment field, dragging the payment field in a direction associated with the received instruction across the first display region of the graphical user interface, wherein said dragging of said payment field causes the display of three selectable icons.

16. The method of claim 15, wherein the purchase option is selected from among a plurality of purchase options including a fair market value purchase option and a one dollar purchase option.

17. The method of claim 15, further comprising:

selecting, by an input of the user input device, a customer from a contacts list, and auto-populating contact information of the customer into customer contact fields;

saving the populated customer contact fields; and associating the contact information of the customer with the product and the payment amount.

18. The method of claim 17, further comprising:

selecting, by an input of the user input device, the product to be leased or financed from a drop-down list;

auto-populating make and model information about the product into product make and product model information fields;

saving the populated product make and product model information fields; and associating the product make and product model information fields with the contact information of the customer.

19. The method of claim 18, further comprising:

generating, by the processor, a quote for the customer, wherein the quote includes the payment amount for the product, the finance charge rate, the purchase option that was used to calculate the payment amount, the total term of the financing or lease that were used to calculate the payment amount, the make and model information of the product, and the contact information of the customer.

20. The method of claim 18, further comprising:

sending, by the transmitting unit of the computing device, the quote via email to the customer.

21. The method of claim 18, further comprising:

accepting the quote by receiving a signature of the customer inputted by the user input device and a social security number inputted by the user input device.

\* \* \* \* \*